United States Patent [19]

Sonobe et al.

[11] Patent Number: 5,377,309
[45] Date of Patent: Dec. 27, 1994

[54] SOFTWARE WORK TOOL

[75] Inventors: Masayuki Sonobe; Ayumi Ishizaki; Tatsuo Kondoh, all of Kawasaki, Japan

[73] Assignee: Fujitsu Limited, Kawasaki, Japan

[21] Appl. No.: 799,445

[22] Filed: Nov. 27, 1991

[30] Foreign Application Priority Data

Nov. 27, 1990 [JP] Japan .................. 2-323765

[51] Int. Cl.⁵ .............................................. G06F 15/18
[52] U.S. Cl. ......................................... 395/76; 395/53; 395/62; 395/75; 395/64
[58] Field of Search ....................... 395/53, 75, 76, 62

[56] References Cited

U.S. PATENT DOCUMENTS

| | | | |
|---|---|---|---|
| 4,972,328 | 11/1990 | Wu et al. | 395/76 |
| 5,016,204 | 5/1991 | Simoudis et al. | 395/53 |
| 5,101,362 | 3/1992 | Simoudis | 395/53 |

OTHER PUBLICATIONS

R. Bisiani, et al., "A Tool To Coordinate Tools", IEEE Software vol. 5, No. 6, pp. 17-25, Nov. 1988, Los Alamitos, Calif.

G. E. Kaiser, et al., "Database Support for Knowledge-Based Engineering Environments", IEEE Expert, vol. 3, No. 2, pp. 18-32, 1988, New York, N.Y.

A. Barr, et al., "Chapter III: Representation of Knowledge", The Handbook of Artificial Intelligence, Vol. I, pp. 153-171, 1981, William Kaufman, Inc., Los Altos, Calif.

L. D. Erman, et al., "ABE: An Environment for Engineering Intelligent Systems", IEEE Transactions on Software Engineering vol. 14, No. 12, pp. 1758-1769, Dec. 1988, New York, N.Y.

Primary Examiner—Allen R. Macdonald
Assistant Examiner—Richemond Dorvil
Attorney, Agent, or Firm—Staas & Halsey

[57] ABSTRACT

A software work tool used in an information processor and realizing a general purpose software work tool capable of automatically performing a software operation based on the information regarding a program. The software work tool comprises a software operator for operating a program or data, a work knowledge storer for storing as a work knowledge the information for an operation by the software operator, a communicator for externally transmitting communication information including a work request or a work report, and a controller for controlling, based on the work knowledge stored in a work knowledge storer, the software operator, the work knowledge storer, and the communicator.

30 Claims, 24 Drawing Sheets

FIG. 4

```
(CC   (-0   test. 0)
      ( test. c    ))
```

EXECUTION COMMAND KNOWLEDGE

EXECUTION SUPERVISORY TIME (60000 msec))

SUPERVISORY TIME BY TIMER

FIG. 5

```
CC - 0  test · C>&  std · out
```

FIG. 6

| | |
|---|---|
| (a) | (EXECUTION ACCEPTANCE NORMAL) |
| (b) | (EXECUTION ACCEPTANCE B NORMAL (NO PROGRAM)) |
| (c) | (EXECUTION COMPLETION NORMAL) |
| (d) | (EXECUTION COMPLETION ABNORMAL (NOT ENDED FORCED TO END AT 6000 MILLISECONDS (EXECUTION COMPLETION NORMAL))) |

FIG. 7A

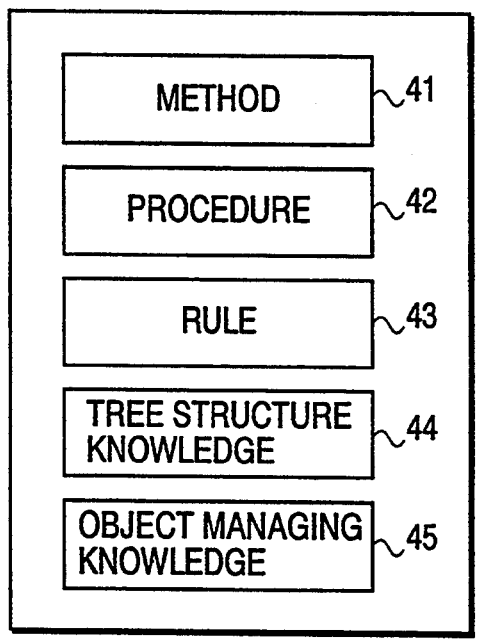

- METHOD ~41
- PROCEDURE ~42
- RULE ~43
- TREE STRUCTURE KNOWLEDGE ~44
- OBJECT MANAGING KNOWLEDGE ~45

FIG. 7B

```
( (SELECTOR NAME a   (ARGUMENT TYPE 1a   ARGUMENT 1a)
                     (ARGUMENT TYPE 2a   ARGUMENT 2a)
                     (ARGUMENT TYPE ma  ARGUMENT ma) )
  ((SELECTOR NAME b  (ARGUMENT TYPE 1b   ARGUMENT 1b)
                     (ARGUMENT TYPE 2b   ARGUMENT 2b)
                     (ARGUMENT TYPE nb  ARGUMENT nb) )
       ------                                         )
```

FIG. 7C

```
( (PROCEDURE NAME  ·    PROCEDURE 1)
   INSTRUCTION 1        INSTRUCTION 2
  ( IF CONDITION 1,       THEN INSTRUCTION 3
              OTHERWISE  (INSTRUCTION 4    INSTRUCTION 5) )
         (INSTRUCTION 7 INSTRUCTION 8) )
```

FIG. 7D (1) : ( (RULE GROUP NAME · RULE GROUP 1) :
(2) : (IF CONDITION 1, THEN ALWAYS INSTRUCTION 1) :
(3) : (IF CONDITION 2, THEN ALWAYS INSTRUCTION 2) :
(3) : (IF CONDITION 3, THEN ALWAYS INSTRUCTION 3) :

FIG. 7E (EMPLOYEE,   TARO YAMADA  (AGE 25,
             BELONGS TO PERSONNEL SECTION) )

FIG. 11

| USE DISPLAY<br>0: NOT YET USED<br>1: BEING USED | TYPE OF EVENT<br>1: TIMER ACTIVATION<br>2: MESSAGE ACTIVATION | TIMER INTERVAL<br>(MILLISECOND) | MESSAGE IDENTIFIER INFORMATION | ADDRESS (LOCATION) OF FUNCTION EXECUTING EVENT DECISION PROCESSING |
|---|---|---|---|---|
| 1 | 1 | 500 | BLANK | 02E80000 |
| 1 | 2 | 0 | ABCXXXXX | 02E80200 |
| 0 | | | | |

FIG. 13B

1. CALCULATE CHARGE OF RESERVED SEAT BY ACCESSING DATA CHARGE TABLE AND RETURN THE SAME

FIG. 13C

1. DETECT VACANT SEAT OF RESERVED TRAIN FROM DATA
2. RETURN MESSAGE OF SEAT NUMBER

FIG. 13D

1. STORE DESIGNATED TRAIN

2. TRANSMIT MESSAGE OF RESERVATION PROCESSING TO RESERVED SEAT OBJECT
    SEAT NUMBER IS RETURNED

3. TRANSMIT MESSAGE OF CHARGE INQUIRY PROCESSING TO RESERVED SEAT OBJECT
    CHARGE IS RETURNED

4. TRANSMIT SEAT NUMBER AND CHARGE TO TERMINAL OF STATION

FIG. 18A
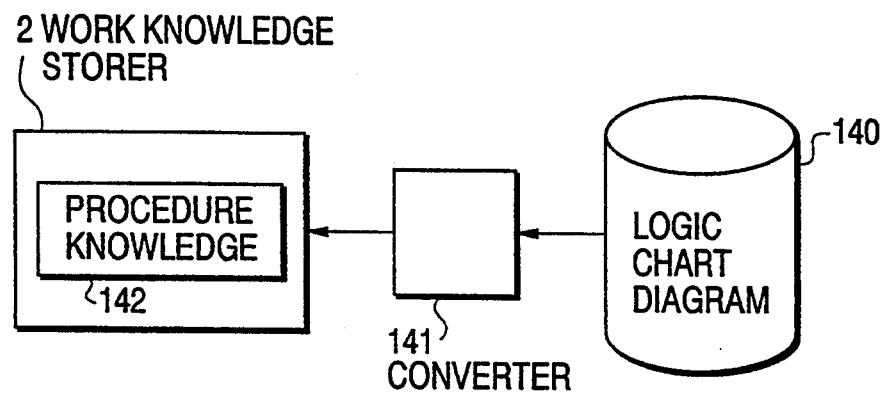
FIG. 18B
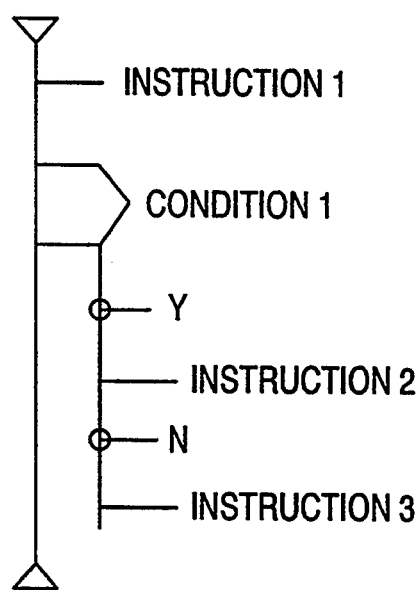
FIG. 18C
( INSTRUCTION 1 (IF CONDITION 1, THEN
INSTRUCTION 2, OTHERWISE INSTRUCTION 3 ) )

| CONDITION 1 | Y | Y | N | N |
|---|---|---|---|---|
| CONDITION 2 | Y | N | Y | N |
| INSTRUCTION 1 | X | | | X |
| INSTRUCTION 2 | | | X | X |

( ( IF ( CONDITION 1 AND CONDITION 2 ), INSTRUCTION 1 )
( IF ( REVERSE TO CONDITION 1 AND CONDITION 2 ), THEN INSTRUCTION 2 )
( IF ( REVERSE TO CONDITION 1 AND REVERSE TO CONDITION 2 ), THEN
INSTRUCTION 1 INSTRUCTION 2 ) )

FIG. 20A
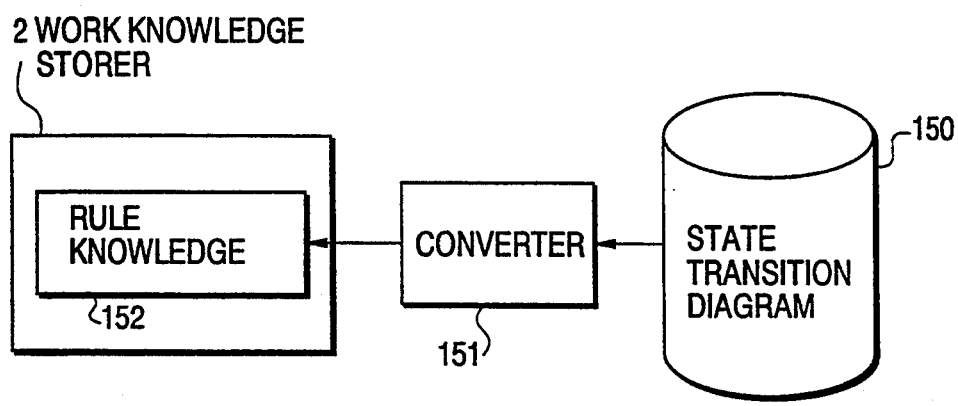
FIG. 20B
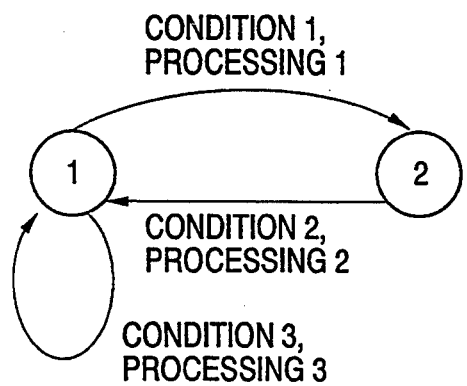
FIG. 20C
((IF (STATE = 1 AND CONDITION 1), THEN ALWAYS (PROCESSING 1 STATE = 2))
((IF (STATE = 2 AND CONDITION 2), THEN ALWAYS (PROCESSING 2 STATE = 1))
((IF (STATE = 1 AND CONDITION 3), THEN ALWAYS (PROCESSING 3)))

FIG. 21A
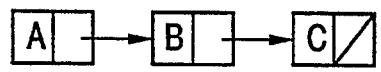
FIG. 21B
( A   B   C )
FIG. 21C
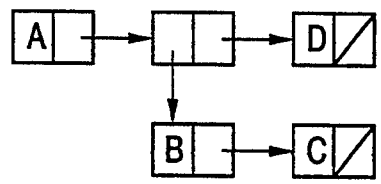
FIG. 21D
( A  ( B   C )   D )
FIG. 21E
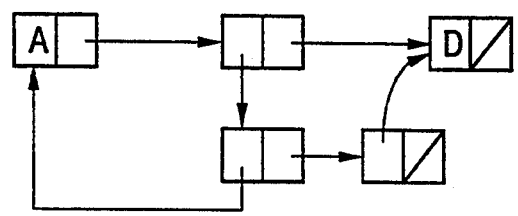
FIG. 21F
( A   (↓   ↓)   D )
  ↑ --- ↓   ↓ --- ↑

SOFTWARE WORK TOOL

BACKGROUND OF THE INVENTION

1. Field of the Invention

This invention relates to an information processing apparatus and, more particularly, to a method of constructing a software work tool used in software work on the information processing apparatus.

2. Description of the Related Art

Information processing apparatuses range from devices for processing numeric data (i.e., computers) to devices for processing general information, such as sentences, voices and images. Recently, by effectively utilizing results of research into artificial intelligence (AI), information processing apparatuses have been developed that can even handle knowledge of human beings such as natural languages.

However, almost all the information processing apparatuses are based on the stored program system. Therefore, development and operation of software (i.e., programs and information such as document, specification, environment definition and data) are indispensable to the information processing apparatus' function.

Work on software development and software operation involves creation of a program execution environment; activation of a program; input of information to the program; supervision of the program; decoding of the program's processed result; decoding of the program's output; and input, manipulation, output and creation of information.

In work like software development, software operation, etc. a person must initially operate the software, observe the processing situation and determine the operation to be executed next.

For this reason, software development and software operation takes a lot of time and money.

Thus, to save time, a variety of software tools have been created on the information processing apparatus so that the software can be operated automatically. Various tools have been created to facilitate this software work and are now well known.

However, all software work cannot be automated by the use of a computer and an operating system. In practice, conventional operating systems have a component called a job controller by which software activation can be supervised and the simple succeeding processing can be activated depending on the processed result. However, the mechanism for automating the software work according to the prior art is very primitive.

This is because the conventional technology provides only software work tools such as job controllers in which a special tool for manipulating particular information is created and special tool groups are activated in substantially the given order. Accordingly, if the software work becomes slightly complicated, additional works such as development and operation of special tools are needed. This hardly contributes to the saving of labor. Rather, it increases the number of software and makes the software work more complicated. In addition, these special tools are not designed to communicate with each other with respect to software work. Therefore, if a file output from a certain special tool is input to another special tool, then special tools for converting the format must be developed and operated only for that set of two special tools. Consequently, the number of special tools is markedly increased. For example, whereas 4 special tools need 6 sets, 5 special tools need 10 sets and 100 special tools need 4,950 sets.

So long as software work tools are created by the conventional program creating method, they are created such that special knowledge is examined and fixed to the program. This results in the shortcoming that knowledge cannot be investigated and added with ease while the software work tool is being-operated. Further, a process such as a design of a work plan in which a correct answer and an optimum solution are searched from a lot of possibilities, depends on a human being. This process frequently takes a lot of time and also frequently degrades the quality of the software work tool.

An expert system and a cooperation type expert system are now available as well-known technologies resulting from research into AI technology. Since expert systems includes knowledge and an inference device and are flexible in their forms of expression, they have a characteristic which enables knowledge to be easily investigated and added while they are being operated. Further, expert systems can execute processing for searching the correct answer and the optimum solution from a lot of possibilities in a short period of time. Furthermore, in the case of cooperation type expert systems, an instruction for executing a communication between two expert systems is prepared so that the communication is frequently performed on the basis of an object-oriented calculation model which can transmit and receive information as an inference material.

However, even though individual expert systems have been developed as special systems in which particular software is operated and observed by requesting the operating system, a software operation unit is not incorporated in their design. Thus, they are not useful for users who want to operate different software. Also, even if the software is the same, such expert systems are not sufficiently useful for users who need different experience and knowledge. In every specialized field, it is necessary to create a special expert system for requesting the operating system to operate the software. This problem has not yet been solved.

Software tools (such as "Automator" marketed by "Direct Technology" for IBM compatible PCs), which is as well be called software robots, for use by personal computers are now commercially available in the U.S. market. According to these software tools, a picture screen, a central processing unit (CPU) register, a memory, a key depression or a supervisory program for checking the condition by reading a timer are activated on the memory, and the picture screen, the memory, an application program or data output to a host computer are carried out automatically instead of requiring a key depression by the user in accordance with a procedure and a rule described by the user. Thus, the fixed form work of the user is replaced.

Let us consider the arrangement of the above software tool. Firstly, it has no communication device for another software tool of the same kind. That is, it is not provided with a communicator for transmitting and receiving communication information including work requests and work reports as will be described in this invention.

Secondly, it is not designed to return the execution request result from the software via the operator or the observation unit. That is, it includes only means for judging fragmentary influences output to the hardware which might be the picture screen and the memory. In other words, it is not provided with a software operating unit which will be described with regard the present invention.

Thirdly, it has a device for storing an operation procedure given by the user. However, this operation procedure merely comprises the supervision of the hardware and the input acting for the key depression, as described above. That is, it is not provided with a work knowledge storer for storing operation programs and information operation as will be described in this invention.

As described above, this software tool aims at small-scale and low-level applications in which a plurality of input programs acting for the key strokes are independently operated in parallel. In conclusion, the above-mentioned software tool lacks the features of this invention and is not intended to constitute a general purpose software work tool, as is this invention, in which work is supported by expert knowledge of software development and operation in a self-differentiating fashion.

It has been very difficult to design a strong general purpose software work tool because a significant amount of time cannot be saved if experience and knowledge in a specific field of the software work (e.g., the way of erasing an unnecessary file from an external storage device) are not incorporated in the other software work tool.

However, a software work tool with knowledge based on experience in a variety of special fields is too large and its performance is too poor, thus requiring frequent correction.

Such a software work tool may be connected to another software work tool without a communication device by direct program access, or such that one tool writes in the file while the other reads from it. With this topology, if the design of a certain software work tool is changed, the design of the other software work tool may often be greatly changed. In this case, the two software work tools depend on each other very strongly, making software development and operation very expensive. Accordingly, there is a problem that the design and maintenance of the entire system for supporting the software work are very difficult.

SUMMARY OF THE INVENTION

This invention pertains to a method of constructing a software work tool for use in software work for an information processing apparatus.

It aims at providing a general purpose software work tool for isolating and minimizing work by automatically executing software operation on the basis of information concerning the work and also by creating information concerning the work in an autonomously distributed fashion.

A software work tool in an information processing apparatus comprises a software operator for carrying out an operation on a program or information; a work knowledge storer for storing the information for the operation as work knowledge; a communicator for transmitting and receiving communication information including a work request or a work report to and from the outside; and a controller for controlling the software operator, the communicator and the work knowledge storer on the basis of work knowledge stored in the work knowledge storer.

BRIEF DESCRIPTION OF THE DRAWINGS

A better understanding of the objects, features and advantages of the invention can be gained from a consideration of the following detailed description of the preferred embodiments thereof, in conjunction with the figures of the accompanying drawings, wherein:

FIG. 4 is a schematic diagram showing an embodiment of software operation request information;

FIG. 5 is a schematic diagram showing an embodiment of an execution command supplied from the software operator to an operating system;

FIG. 6 is a schematic diagram showing an embodiment of information sent to a controller from the software operator;

FIGS. 7A through 7E are schematic diagrams showing an embodiment of contents of a work knowledge base;

FIG. 11 is a schematic diagram showing an embodiment of contents of an internal memory used in the observer;

FIG. 18 is a schematic diagram showing an embodiment in which the work knowledge storer is provided with a knowledge input in the format of a logical chart diagram;

FIG. 20 is a schematic diagram showing an embodiment in which the work knowledge storer is provided with a knowledge input in the format of a state transition diagram;

FIG. 21 is a schematic diagram showing data of a list structure, a tree structure or a graph structure included in the work knowledge storer;

DETAILED DESCRIPTION OF THE PREFERRED EMBODIMENTS

Prior to the description of the preferred embodiments of the invention, principles of this invention will be described below with reference to FIGS. 1A and 1B.

Figure 1A:
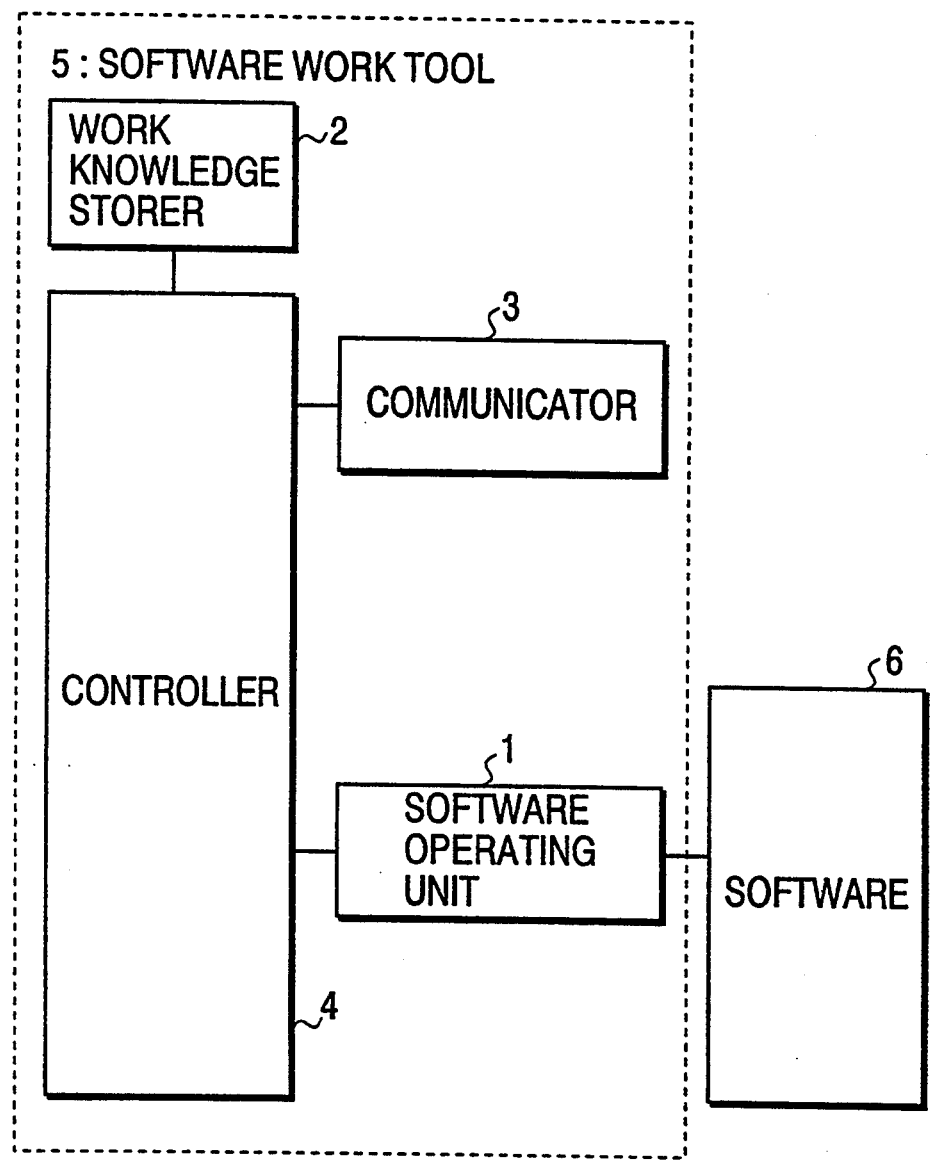
FIG. 1A is a block diagram used to explain a principle of the first embodiment of the present invention.
Figure 1B:
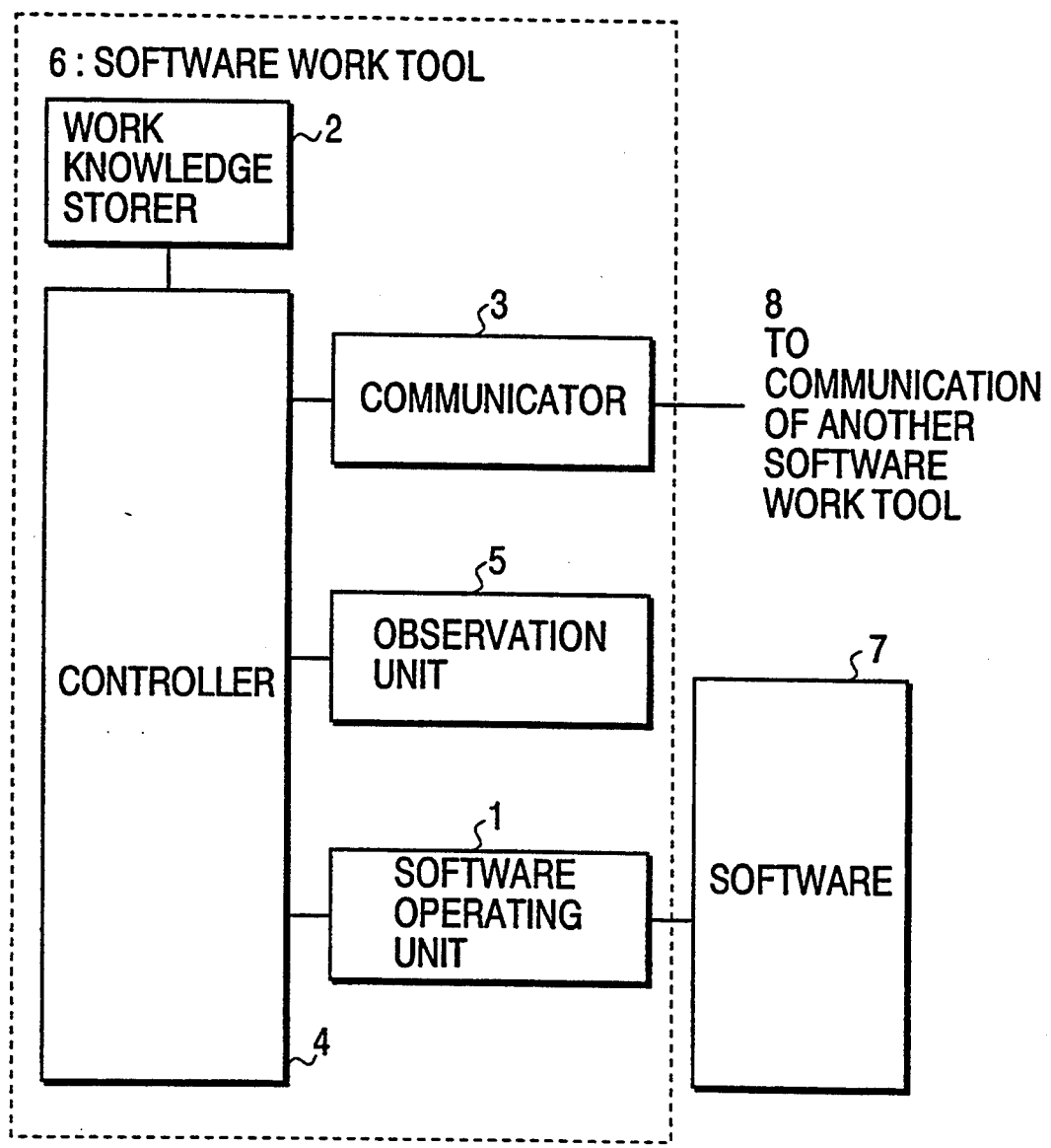
FIG. 1B is a block diagram used to explain a principle of the second embodiment of the present invention.

FIGS. 1A and 1B are block diagrams showing principles of this invention, to which references will be made in explaining principles of a software work tool used in a variety of an information processing apparatuses.

FIG. 1A shows the principle of the first embodiment of the present invention. As shown in FIG. 1A, a software operating unit 1 executes an operation on a program provided as a software or as information. A work knowledge storer 2 is a work knowledge base which, for example, stores a method and a sequential order of operation done by the software operating unit 1 or information used to determine a logical execution condition.

A communicator 3 directly or indirectly transmits/receives a work request, a work report or information about a conversation between it and the user, the operator or other similar software work tools. A controller 4 executes various control operations to instruct the software operating unit 1 to perform the operation, the communicator 3 to perform the communication and the work knowledge storer 2 to update the work knowledge on the basis of the work knowledge stored in the work knowledge storer 2.

FIG. 1B shows the principle of the second embodiment of the present invention. Comparing FIGS. 1A and 1B, the arrangement of FIG. 1B is the same as that of FIG. 1A except that an observer 5 is added. The observer 5 is adapted to observe a software provided as an operated result of the software operating unit 1 within its software work tool or of a software operator of another software work tool which executes the operation on the above-mentioned program or information.

In this invention, the work knowledge storer 2 includes various kinds of knowledge, such as production rules, frames, objects, meta-knowledge and so on. The controller 4 controls the software operating unit 1 to execute the operation on the software on the basis of the information stored in the work knowledge storer 2, information received from the communicator 3 or information input from the observer 5, adds information to the work knowledge storer 2 or changes information, and communicates with other software work tool via the communicator 3.

Cooperation in work among a plurality of software work tools is achieved by the communication and, if communication protocols are integrated, the software work tools can be connected very easily and the number of the software work tools connected can be increased. Then, it becomes possible to execute the work that should be executed within its tool while affecting the external software.

More specifically, the software work tools include work knowledge storers and are designed to cooperate with each other via communication. Therefore, experience and knowledge in the special field of the software work, e.g., a method of erasing an unnecessary file from an external storage device, can be utilized independently by the individual software work tools. Further, the software work tools are connected to the outside by means of communication information so that, even if the design of the knowledge in a certain software work tool is changed, the change of the knowledge in other software work tool is very small, thus greatly simplifying the design and maintenance of the entire system for supporting the software work.

Furthermore, by using inference engineering, the process of searching for a correct answer and an optimum solution from many possibilities can be made simple. For example, when a work schedule is planned by combining element works or when a cause of fault in the software is investigated, a better solution can be obtained in a short period of time.

Figure 2:
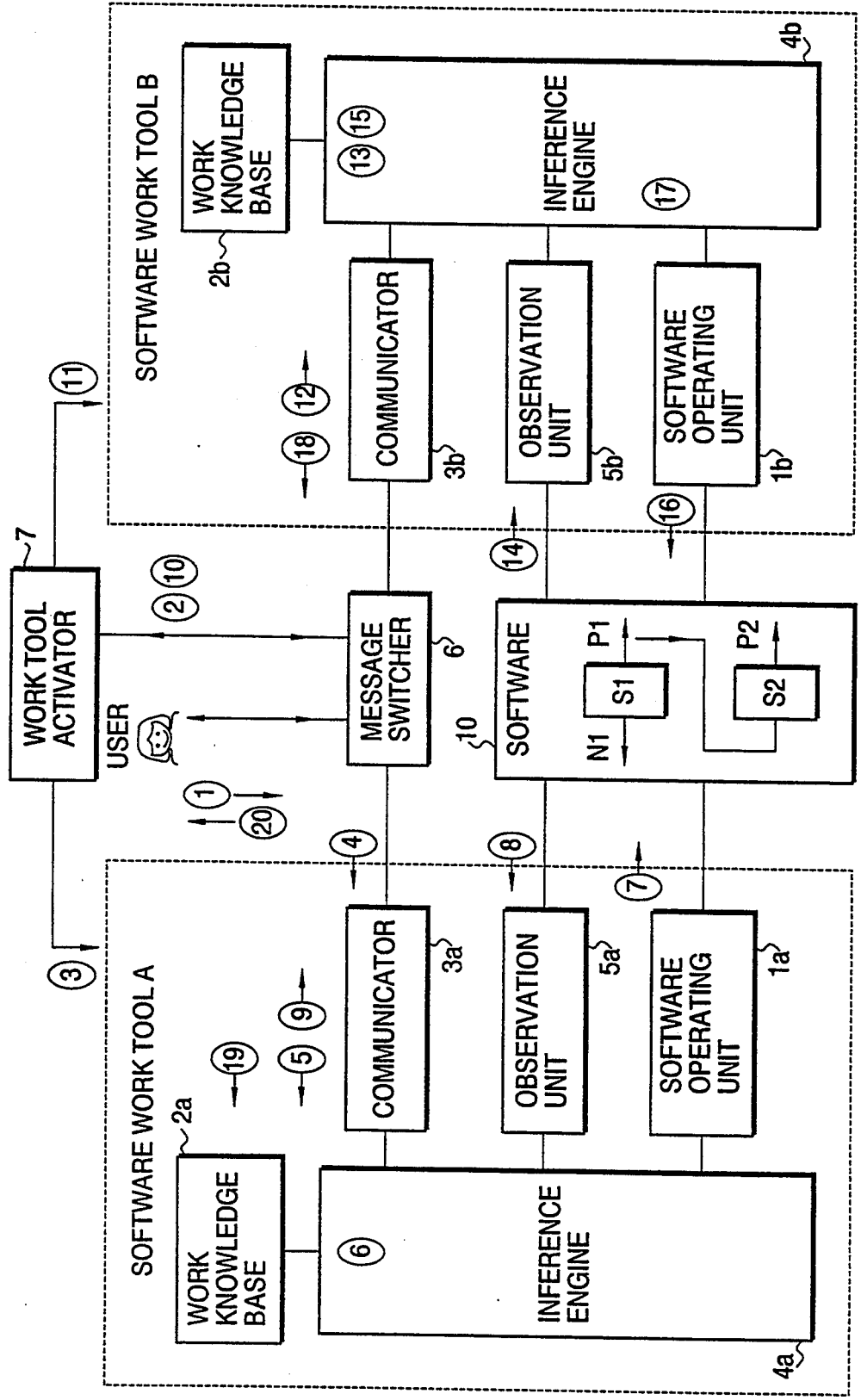
FIG. 2 is a block diagram showing an overall arrangement of the embodiment of this invention.

FIG. 2 is a block diagram showing an overall arrangement of an embodiment of a system in which two software work tools are connected.

Referring to FIG. 2, it will be seen that two [2] software work tools A and B are connected via a message switcher 6 and the two software work tools A and B are activated by a work tool activator 7 to execute operation on a software 10. Similarly to software work tool 6 shown in FIG. 1B, two [2] software work tools A and B respectively comprise software operators $1a$ and $1b$, work knowledge bases $2a$ and $2b$, communicators $3a$ and $3b$, inference engines $4a$ and $4b$, and observation units $5a$ and $5b$. The work knowledge bases $2a$ and $2b$ form the work knowledge storer 2 shown in FIGS. 1A and 1B. The inference engines $4a$ and $4b$ form the controller 4 shown in FIGS. 1A and 1B.

Operation of software work tools A and B will be described in accordance with circled reference numerals ①, ②, ... shown in FIG. 2.

① The user U supplies the message switcher 6 with a message requesting desired work.

② When the message switcher 6 detects that the work should be done by software work tool A, software work tool A is not yet activated and therefore the message switcher 6 requests the work tool activator 7 to activate software work tool A.

③ The work tool activator 7 loads software work tool A to a main memory from an external storage device (not shown) and activates an inference engine $4a$.

④ The message switcher 6 transmits the request message from the user U to communicator $3a$ of activated the software work tool A.

⑤ The communicator $3a$ receives the request message, checks the message and decodes accompanying information.

⑥ The inference engine $4a$ sequentially determines and executes rule-type knowledge satisfying logical conditions from work knowledge base $2a$ by a process corresponding to the message or according to the knowledge. Also, inference engine $4a$ reads and writes frame type knowledge from and in work knowledge base $2a$.

The rule type knowledge is an inference rule formed by a combination of the logical execution condition and the processing method, and the frame type knowledge is a knowledge which describes a relation between a frame provided as a unit of data corresponding to a certain concept and a program, and a plurality of frames.

⑦ An inference engine $4a$ instructs software operator $1a$ to execute the software operation described by the knowledge. Software operator 1a includes an input file N1 of a software S1. It produces an execution command of the software S1 and requests the operating system to execute the above command such that the software S1 is operated.

Further, inference engine 4a supervises the operation of the software S1. If the activation fails, inference engine 4a reads a method of recovering the failure from work knowledge base 2a and instructs the software operator 1a to execute the process.

⑧ Observation unit 5a receives from the operating system information indicating that the output of the software S1 is produced, and decodes an output P1. Knowledge for decoding the output P1 might be stored in work knowledge base 2a.

Consequently, if a new software operation becomes necessary, an instruction is supplied to software operator 1a.

⑨ When requesting work of another software work tool or when requesting a knowledge of another software work tool, inference engine 4a supplies the requested work to the communicator 3a.

The communicator 3a supplies its work request message to the message switcher 6.

⑩ When the message switcher 6 detects that the software work tool which should execute the work is software work tool B, then software work tool B is not yet activated and requests the work tool activator 7 to activate software work tool B.

⑪ The work tool activator 7 loads software work tool B to the main memory from the external storage device (not shown) and activates inference engine 4b.

12 The message switcher 6 sends the request message to communicator 3b of thus activated software work tool B.

⑬ Inference engine 4b also sequentially determines and executes rule type knowledge satisfying logical conditions from work knowledge base 2b by the process corresponding to the message or according to the knowledge. Also, inference engine 4a reads and writes frame type knowledge from and in work knowledge base 2b.

⑭ Observation unit 5b observes that the output P1 of the software S1 is output.

⑮ Inference engine 4b and work knowledge base 2b infer that a software S2 must be activated to receive the output P1 in order to obtain an output P2 desired by the user.

⑯ Inference engine 4b instructs the software operator 1b to make a request to the operating system such that the software S2 is activated.

⑰ When observing that the output P2 is outputted, then software operator 1b analyzes and infers the output P2 in detail and examines whether or not it contains the information desired by the user.

⑱ Inference engine 4b makes a work report and instructs communicator 3b to send the same to the message switcher 6.

⑲ The message switcher 6 sends a message to communicator 3a of software work tool a.

⑳ Inference engine 4a examines the work result on tile basis of knowledge on work knowledge base 2a. If the examined result is satisfactory, then inference engine 4a instructs communicator 3a to send a work completion message to the user U.

㉑ Software work tool A has no work to do, so it saves the knowledge base in an external storage device (not shown) and it thus disappears from main storage.

Software work tool B remains in main storage, so it can work independently whenever an event of the same kind is observed.

Figure 3:
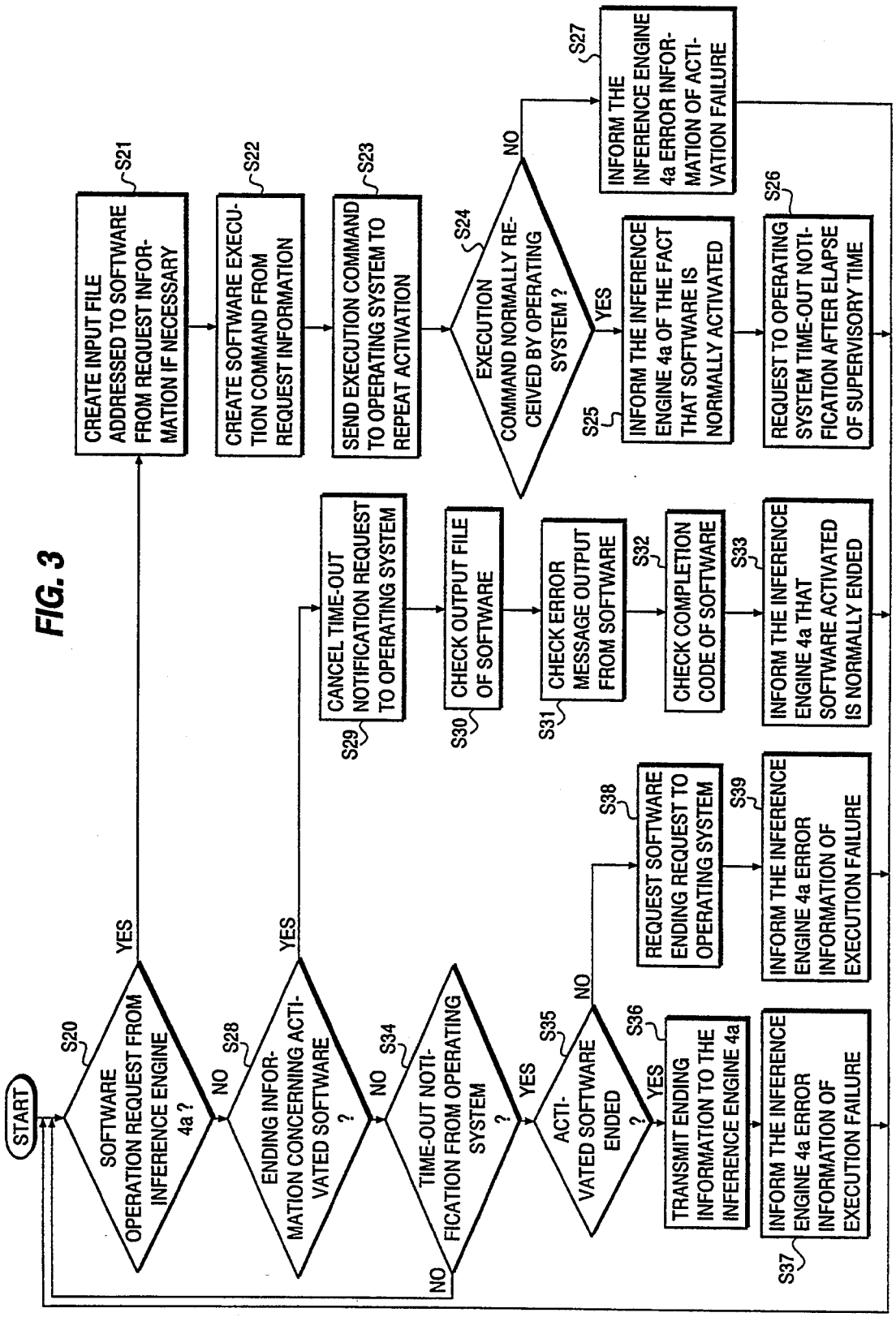
FIG. 3 is a flowchart to which references will be made in explaining the embodiment of a processing of a software operator.

FIG. 3 is a flowchart to which reference will be made in explaining the embodiment of the processing of the software operator.

Referring to FIG. 3, following the Start of operation, it is determined in decision step S20 whether or not the request is the software operation request from inference engine 4a. If it is, as represented by a YES at decision step S20, then the process proceeds to step S21, whereat an input file addressed to the software is created from the request information, if necessary. In the next step S22, a software execution command is created and in the next step S23, the execution command is sent to the operating system of this software work tool to request the activation.

In the next decision step S24, it is determined whether or not the operating system normally receives the execution command. If the execution command is normally received by the operating system as represented by a YES at decision step S24, then the processing proceeds to step S25, whereat information indicating that the execution command is normally received by the operating system is sent to inference engine 4a. In the next step S26, a time-out notification after an elapse of a supervisory time is requested to the operating system and then the processing is returned to step S20. If, on the other hand, the execution command is not normally received by the operating system, as represented by a NO at decision step S24, then the processing proceeds to step S27, whereat error information indicating activation failure is sent to inference engine 4a, and then the processing is returned to step S20.

If the request is not the software operation request from inference engine 4a, as represented by a NO at decision step S20, the processing proceeds to the next decision step S28. In decision step S28, it is determined whether or not the information is the ending information for the activated software from the operating system. If it is, as represented by a YES at decision step S28, then the time-out notification request to the operation system is canceled at step S29, the output file of the software is checked at step S30, an error message is checked at step S31 and a completion code is checked at step S32, and the information that the software is normally ended is sent to inference engine 4a and then the process is returned to the decision step S20.

If the information is not the software ending information from the operating system as represented by a NO at decision step S28, then the process proceeds to the next decision step S34. In step S34, it is determined whether or not the information regards a time-out notification from the operating system. If the information regards the time-out notification as represented by a YES at decision step S34, the process proceeds to the next decision step S35. It is determined in decision step S35 whether or not the activated software is ended. If it is, as represented by a YES at decision step S35, then the ending information and the error information of the execution failure are both sent to inference engine 4a at steps S36 and S37 and then the processing is returned to step S20. The error information notified here indicates that an unexpected event caused the software operation to fail and terminate.

If the activated software is not ended, as represented by a NO at decision step S35, the processing proceeds to step S38, wherein the request for a forced ending is sent to the operating system and the error information of the execution failure is transmitted to the inference engine 4a in step S39. Then, the processing is returned to the processing in step S20. Further, if the information does not regard a time-out notification, as represented by a NO at decision step S34, then the process is immediately returned to step S20. The error information transmitted in step S39 indicates that the software operation is compulsorily terminated because the execution time exceeds the limit value.

FIG. 4 shows an embodiment of software operation request information supplied to the software operator.

Referring to FIG. 4, the operation request information comprises execution command knowledge (a) and timer supervisory time (b).

FIG. 5 shows an embodiment of an execution command supplied from the software operator to the operating system.

FIG. 6 shows an embodiment of information sent to the controller from the software operator. Diagrams in FIGS. 6A and 6B show examples of information upon execution reception and illustrate normal reception and abnormal reception.

Diagrams in FIGS. 6C and 6D show examples of the sent information upon execution completion and illustrate examples of normal completion and abnormal completion.

FIGS. 7A through 7E show an embodiment of contents of a work knowledge base. FIG. 7A shows the entire content in which the content of the work knowledge base is composed of a method 41, a procedure 42, a rule 43, tree structure knowledge 44 and object control knowledge 45.

FIG. 7B shows an example of a method which utilizes a selector name received by the software work tool from the communicator as identification data, and a list of arguments as parameters.

FIG. 7C shows an example of the procedure 44 which utilizes a command group defined as functions accessed from the rule.

FIG. 7D shows the embodiment of the rule 43, formed as a set comprising of a condition part for inference and a command.

FIG. 7E shows an example of the tree structure knowledge 44. The tree structure knowledge stores data and facts in the tree structure, and the method, the procedure and the rule may also be considered as a kind of tree structure knowledge. The object control knowledge 45 includes names and high and low relations as tree structure data for carrying out management functions such as retrieval and generation and erasure of the method, the procedure, the rule and the tree structure knowledge.

Figure 8:
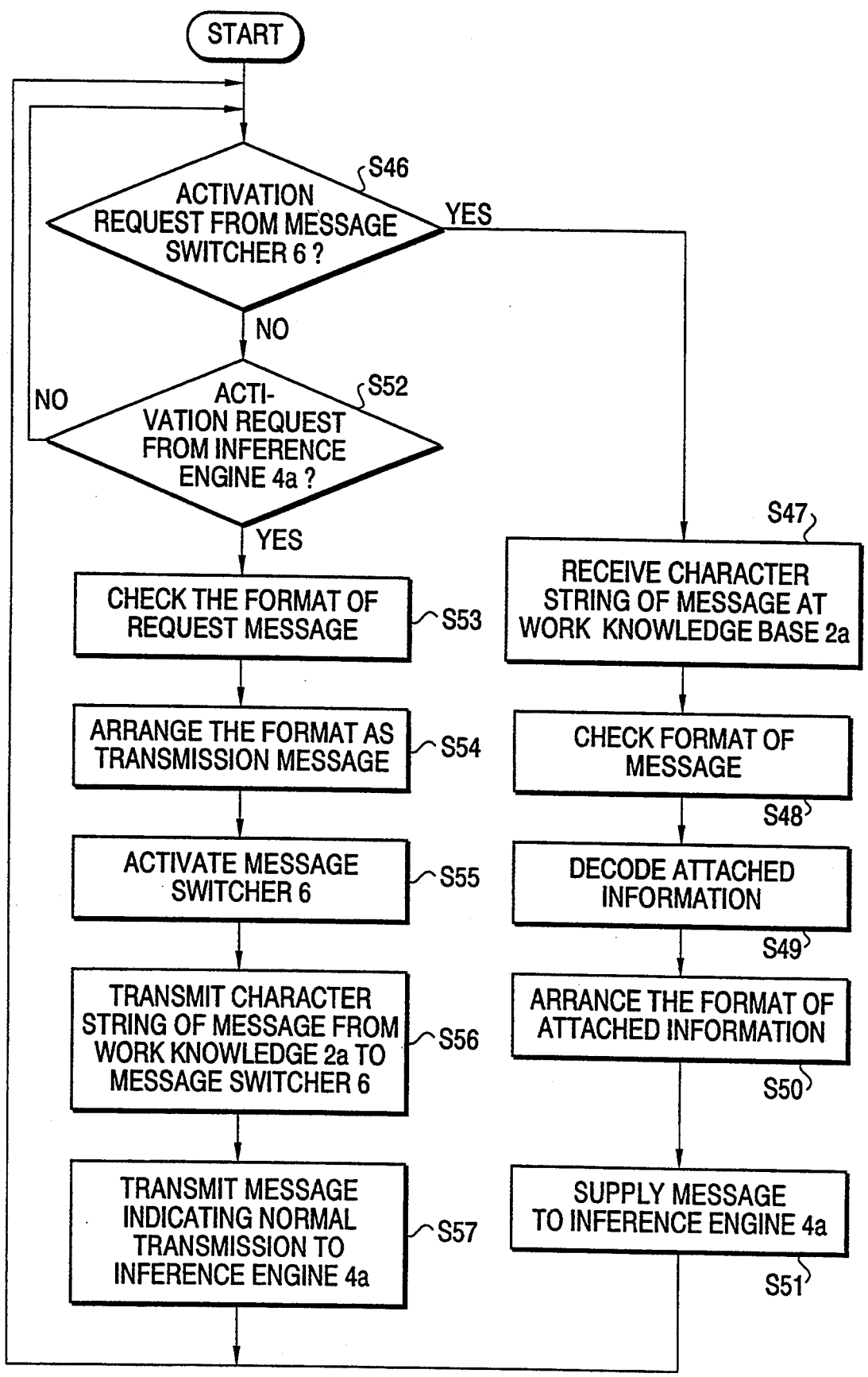
FIG. 8 is a flowchart to which reference will be made in explaining an embodiment of a processing of a communicator.

FIG. 8 shows a flowchart of the embodiment of the process executed by the communicator.

Referring to FIG. 8, following the Start of operation, it is determined in decision step S47 whether or not the activation information is issued from the message switcher 6 shown in FIG. 2. If a YES is output, then a character string of the message is received by the work knowledge base 2a and the format of the message is checked at step S48. Then, accompanying information is decoded at step S49, the format of the accompanying information is arranged at step S50, the message is supplied to the inference engine 4a at step S51 and then the processing is returned to decision step S46.

If the information is not the activation information from the message switcher 6 as represented by a NO at decision step S46, then the process proceeds to the next decision step S52. It is determined in decision step S52 whether or not the information is the activation information from the inference engine 4a. If a YES is output, then the format of the request message is checked at step S53, the format of the request message is arranged as a transmission message at step S54, the message switcher 6 is activated at step S55, a character string of the message is supplied from the work knowledge base 2a to the message switcher 6 at step 56, information indicating that the character string of the message is normally transmitted to the message switcher 6 and sent to the inference engine 4a at step S57, and then the process is returned to decision step S46. If the information is not the activation information from the inference engine 4a as represented by a NO at decision step S52, then the process is immediately returned to decision step S46.

Figure 9:
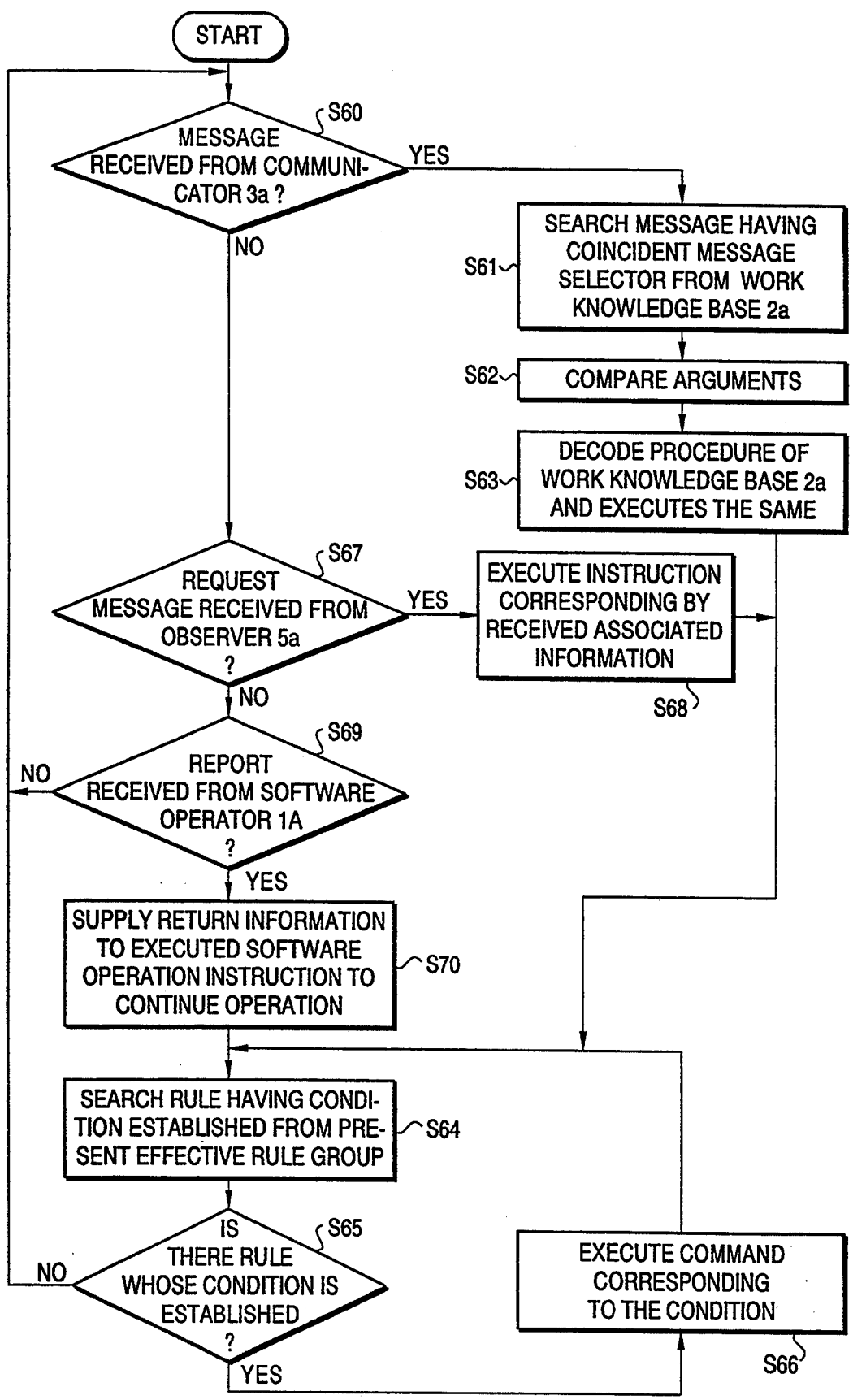
FIG. 9 is a flowchart to which reference will be made in explaining an embodiment of a processing of an inference engine.

FIG. 9 is a flowchart of the embodiment of the processing done by the inference engine.

Referring to FIG. 9, following the Start of operation, it is determined at decision step S60 whether or not information from the communicator 3a is received. If it is, as represented by a YES at decisions step S60, then the process proceeds to step S61. In step S61, messages whose message selectors as described in connection with FIG. 7 are coincident, are searched from the work knowledge base 2a. Then, arguments thereof are compared at step S62 and a procedure stored in the work knowledge base 2a is decoded at step S63 to thereby execute the command. In the next step S64, a presently effective rule group whose condition is established is searched from work knowledge base 2a and it is determined in decision step S65 whether or not a rule group exists whose condition is established. If there is such a rule group, as represented by a YES at decision step S65, then a command corresponding to that condition is executed at step S66 and the steps following step S64 are repeated. If there is no rule group whose condition is established, as represented by a No at decision step S65, the process is returned to decision step S60.

The rule group whose condition is established is searched at steps following step S64 after the command has been executed at step S63 because the inference engine 4a must search a rule group whose condition is established from the rule groups when a value of a variable X indicating the number e.g. of incoming partners, is changed from zero [0] to three [3] by the command execution in step S63.

More specifically, if the rule "if X>1, always then Y=2 and ring a bell" exists within the work knowledge base 2a, then the value of X is changed from zero [0] to three [3] in step S63, thereby making this rule effective and necessitating the rule group to be examined and bell to be rung. Further, if rule "if Y=2, then always print a picture" exists, then it is discovered by checking the rule group in step S64 and the rule is printed on the screen. As described above, the rule is checked in steps S64 and S65 until no rule remains to be activated. When it is determined that no rule exists, the process is returned to decision step S60, whereat it is determined whether or not the information from the communicator 3a is received.

If it is not, as represented by a NO in decision step S60, then the process proceeds to the next decision step S67. In decision step S67, it is determined whether or not the information from observation unit 5a is received. As will be described later, when a certain event takes place, an event identifier and detailed information such as on an error code, a time and so on are sent from the observation unit 5a as information associated with the event so that, if the information from the communicator 3a is received, an instruction corresponding to the, event is executed by the associated information received at step S68. Thereafter, similarly as described before, an instruction corresponding to an effective rule group whose condition is established is executed in steps following step S64.

If the information from observation unit 5a is not received, as represented by a NO at decision step S67, then the process proceeds to the next decision step S69. It is determined in decision step S69 whether or not the information is a report from software operator 1a. A typical example of a reported content from software operator 1a is as follows. When inference engine 4a, for example, supplies an instruction to software operator 1a such that the software operator 1a activates a program p, then the software operator 1a requests the operating system to activate the program p and reports the normal work ending at a timing point in which software operator 1a recognizes that the work is ended normally. Also, at that time, if the supervision of 60 minutes is executed by the observer 5a, then the abnormal state in which the program p, which is normally ended within a few minutes, is not ended after 60 minutes is detected by a timer and a detected result is reported to the inference engine 4a. This is a typical example of the content received by the observation unit 5a at decision step S69.

If the information that the program p is ended normally is reported from the software operator 1a, as represented by a YES at decision step S69, the process proceeds to step S70. In step S70, a return information is supplied to the software operation instruction currently being executed and the next instruction is executed. For example, if two [2] instructions are written in the software operation instruction as "(execute a program p) (input the result and execute q)" and if the above two [2] instructions are respectively stored in addresses 200 and 230, inference engine 4a stores address 200 at the timing at which it requests the software operator 1a to execute the program p and receives the return information that the program p is ended normally at a timing at which the process is returned from the software operator 1a. Consequently, to advance the address 200 to the next address 230 such that the instruction "execute q" is executed, the program q is executed by the software operator 1a. In that case, if a list of employees is returned in the program p, then such data is supplied to the program q as return information and data involving a list of wages is returned. Thus, the return information may be expanded into a variety of data.

The operation in which the instruction execution is continued in step S70 not only means that the instruction next to the instruction P halted by request is executed but also means that, as far as possible, instructions arranged in the procedure type are executed sequentially. If the instructions are completely executed in step S70, the processing proceeds to step S64, whereat the existence of instructions to be executed by the rule unlike the procedures which are supplied sequentially, is determined. Further, if the information is not the report from software operator 1a, as represented by a NO at decision step S69, then the process is immediately returned to the decision step S60, whereat it is determined whether or not the information from the communicator 3a is received.

Figure 10:
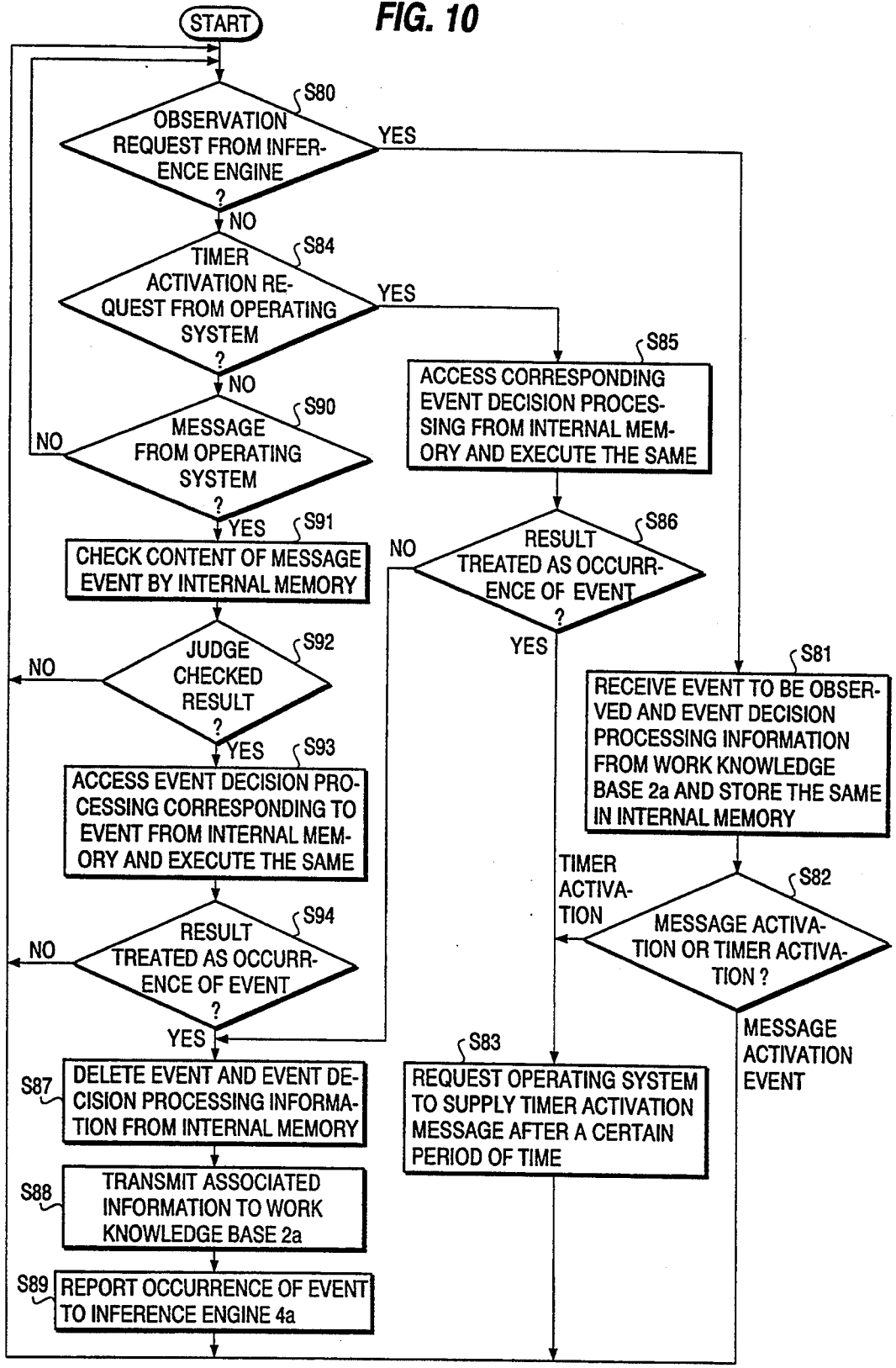
FIG. 10 is a flowchart to which reference will be made in explaining an embodiment of a processing of an observer.

FIG. 10 shows a flowchart to which reference will be made in explaining the processing of the observer according to the embodiment.

As shown in FIG. 10, following the Start of operation, it is determined in decision Step S80 whether or not the information is the observation request from the inference engine 4a. This observation request is frequently carried out at the same time when the inference engine supplies an instruction to the software operator. When the observation is carried out constantly, the observation is requested soon after the software work tool is activated and thereafter events occurring regardless of the software operation timing, that is, events occurring asynchronously, are supervised sometimes.

If the information is the observation request from the inference engine 4a as represented by a YES at decision step S80, then the process proceeds to step S81, whereat information of an event to be observed and an event judging process are received from the work knowledge base 2a and stored in the internal memory of the observation unit 5a. In the next decision step S82, it is determined whether the event to be observed is a timer activation event or a message activation event. If it is a timer activation event, then the process proceeds to step S83, whereat the operating system is requested which receives a timer activation instruction after a certain time. Then the process is returned to decision step S80. If on the other hand the event to be observed is the message activating event, then no process is executed and the process is returned to decision step S80.

The timer activation request made in step S83 is made such that when an electronic mail arrival is examined every ten [10] minutes, for instance, the operating system is requested to timer-activate observer 5a after every elapse of ten [10] minutes.

If the information is not about the observation request from inference engine 4a, as represented by a NO at decision step S80, then the process proceeds to the next decision step S84. It is determined in decision step S84 whether the information is the timer activation instruction from the operating system. If it is, as represented by a YES at decision step S84, the event decision process is accessed from the internal memory and executed at step S85. In the next decision step S86 it is determined whether or not the resultant event is treated as an occurrence of an event. If a YES is output at decision step S86, then the above event and the information of the event decision process are deleted from the internal memory at step S87. In the next step S88, as described before, the event identifier and detailed information such as the error code, the time and the like of that event are, if necessary, transmitted to the work knowledge base 2a as the associated information of the event that occurred and the occurrence of the event is reported to the inference engine 4a in step S89. Then the process is returned to decision step S80. If a NO is output in step S86, then the processing is returned through step S83 to decision step S80.

Here, as a concrete example of event judgment process executed in S85, a case is explained where a received electronic mail is from a boss, assuming that the electric mail arrival is examined every ten [10] minutes, as described earlier.

A First Step: The number of mails delivered to a file called an electronic mail box is counted.

A Second Step: If the number is zero [0] the process terminates, or go to the next step otherwise.

A Third Step: One [1] electronic mail is read, and if there is none the process terminates.

A Fourth Step: It is judged whether or not the originator of the electronic mail is a boss. The process continues to the next step if the judgment is affirmative, or reverts to the third step if the judgment is negative.

A Fifth Step: Because a boss originates the electronic mail, the electronic mail is considered as an urgent mail. A message "A mail has arrived from a boss. Please see the mail box as soon as possible." is displayed on a monitor. Then, the process from the third step is repeated.

In such an event judgment process, it is assumed that the head end address of the process procedure is stored in a later described function address column shown in FIG. 11.

If the information is not the timer activation request from the operating system, as represented by a NO at decision step S84, then the process proceeds to the next decision step S90. In decision step S90, it is determined whether or not the information is a message from the operating system. If it is, as represented by a YES at decision step S90, the process proceeds to the next step S91, whereat it is determined by the internal memory whether or not the message is the message event to be requested. A checked result is determined in the next decision step S92. If the message is the message event requested, as represented by a YES at decision step S92, then in the next step S93 a decision process corresponding to the message event is accessed from the internal memory and executed. It is determined in decision step S94 whether or not the message event is treated as the occurrence of an event. If it is, as represented by a YES at decision step S94, then the process is returned to decision step S80 through steps S87 through S89. Further, if the information is not a message from the operating system, as represented by a NO at decision step S90, and if the event is not the requested event, as represented by a NO at decision step S92, then the process is immediately returned to decision step S80.

FIG. 11 shows an embodiment of the content of the internal memory in the observer.

Referring to FIG. 11, after the busy display, "0" in non-use and "1" in use, the type of event to be observed, "1" in the timer activation and "2" in the message activation, is stored, and a timer interval and an address of a function for executing the event decision process are stored for the timer activation event. Also, a message identifying information and an address of a function for executing the event decision process are stored for the message activation event.

Figure 12:
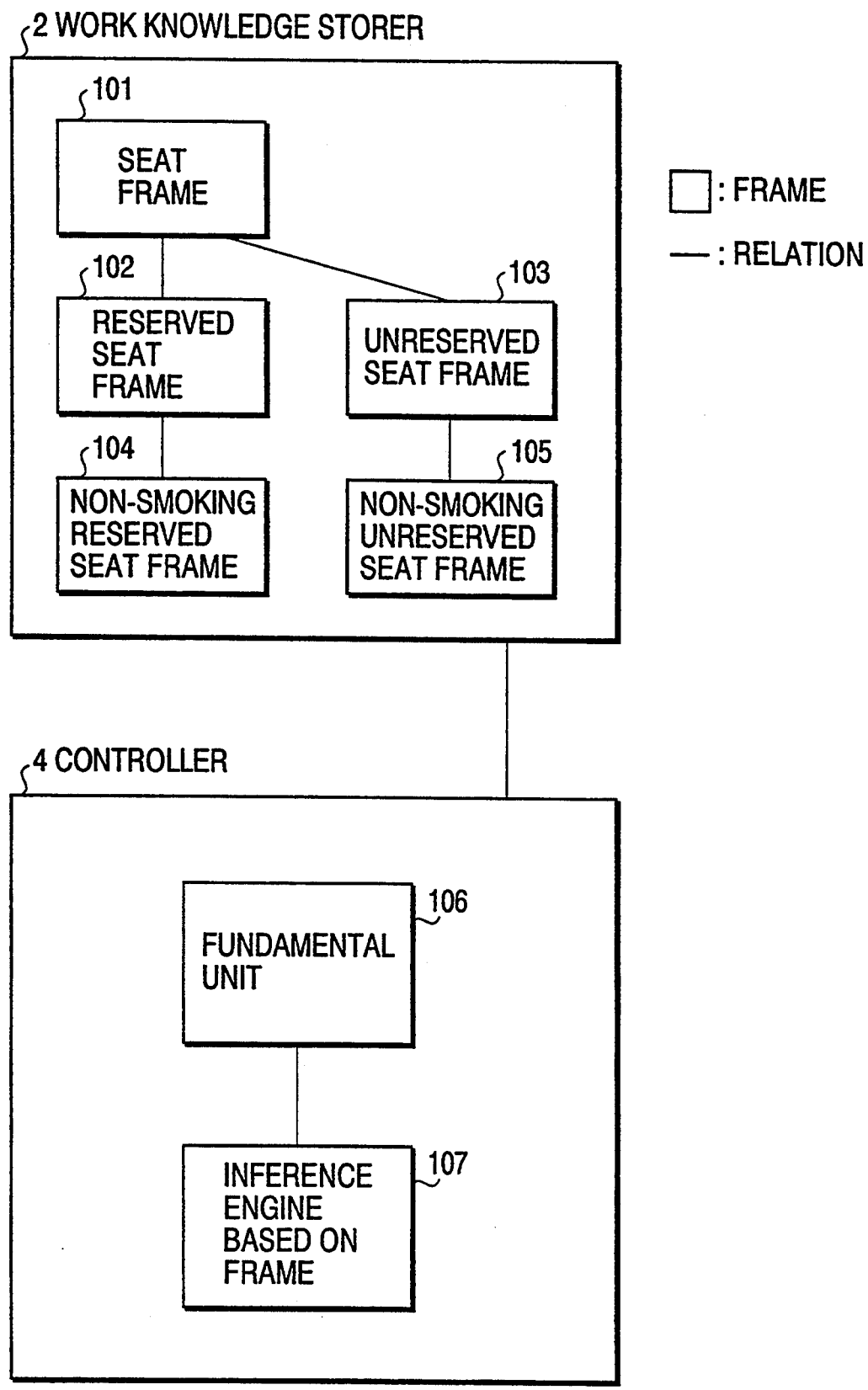
FIG. 12 is a block diagram showing an arrangement of an embodiment for carrying out a processing based on a frame.

FIG. 12 is a block diagram of the arrangement of an embodiment in which processing is carried out on the basis of a frame. FIG. 12 corresponds to FIG. 1 and shows only portions which need be described. In this case, a frame means a frame of knowledge used to solve the problem and in which data corresponding to a certain concept, a program and a relation with another concept are described as a unit according to the format of this frame.

The concept of a passenger seat 101, for example, includes a date, a train number, a seat number and the existence or absence of a reservation as data concerning the concept of the seat. It also includes a vacant situation inquiry, reservation and cancel as associated programs. Further, the relation indicates an entirety versus portion relation such that the seat frame 101 comprises a reserved seat frame 102 and an unreserved seat frame 103 and also indicates a general versus special relation such that a non-smoking reserved seat frame 104 is a kind of reserved seat frame 102. An inference engine 107 based on the frame goes from a special concept back to a general concept, accesses data and program, and makes an inference by utilizing the entirety versus portion relation.

Figure 13A:
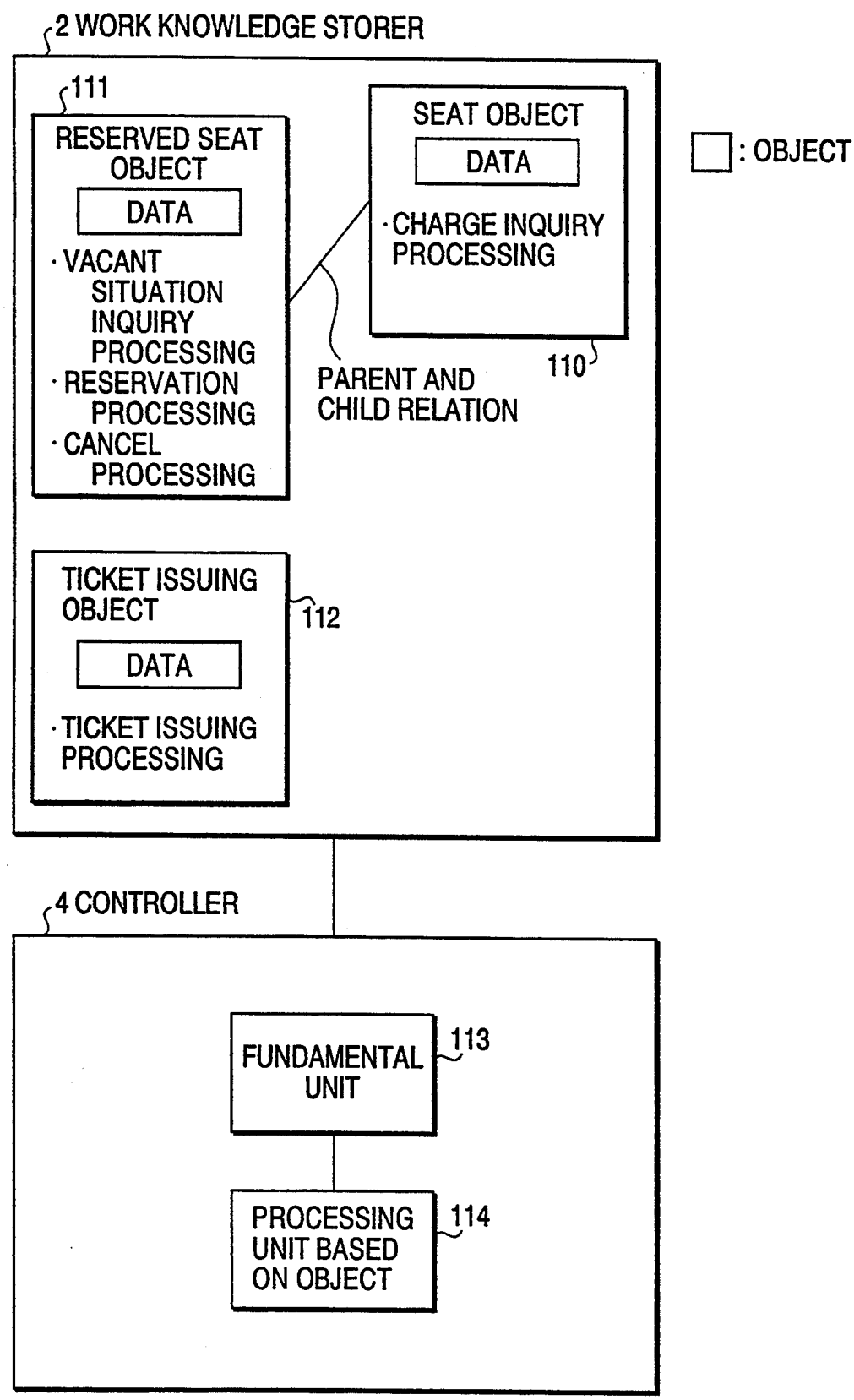
FIG. 13 is a block diagram showing an arrangement of an embodiment for carrying out a processing based on an object.

FIG. 13 is a block diagram showing the arrangement of the embodiment in which the processing based on an object is executed. As shown in (a) in FIG. 13, the work knowledge storer includes a seat object 110, a reserved seat object 111 and a ticket issuing object 112. A controller comprises a fundamental unit 113 and a processing unit 114 based on the object. Diagram (b) in FIG. 13 shows a charge inquiry process provided in the inside of the seat object 110, diagram (c) in FIG. 13 shows a reservation process provided in the inside of the reserved seat object 111, and diagram (d) in FIG. 13 shows the content of a ticket issuing process provided within the ticket issuing object 112.

When an instruction for sending a message to the knowledge specified by the object is executed by the controller, the processing unit 114 based on the object reads the process identified by the message from the designated processing, i.e. method, and executes the same. Even when the charge inquiry message is sent to the reserved seat object 111, the reserved seat object has no such processing. However, from a succession relationship, the reserved seat object 111 is related to the seat object 110 in the form of a parent and child relationship so that the processing unit 114 based on the object activates the charge inquiry processing of the seat object 110.

Figure 14:
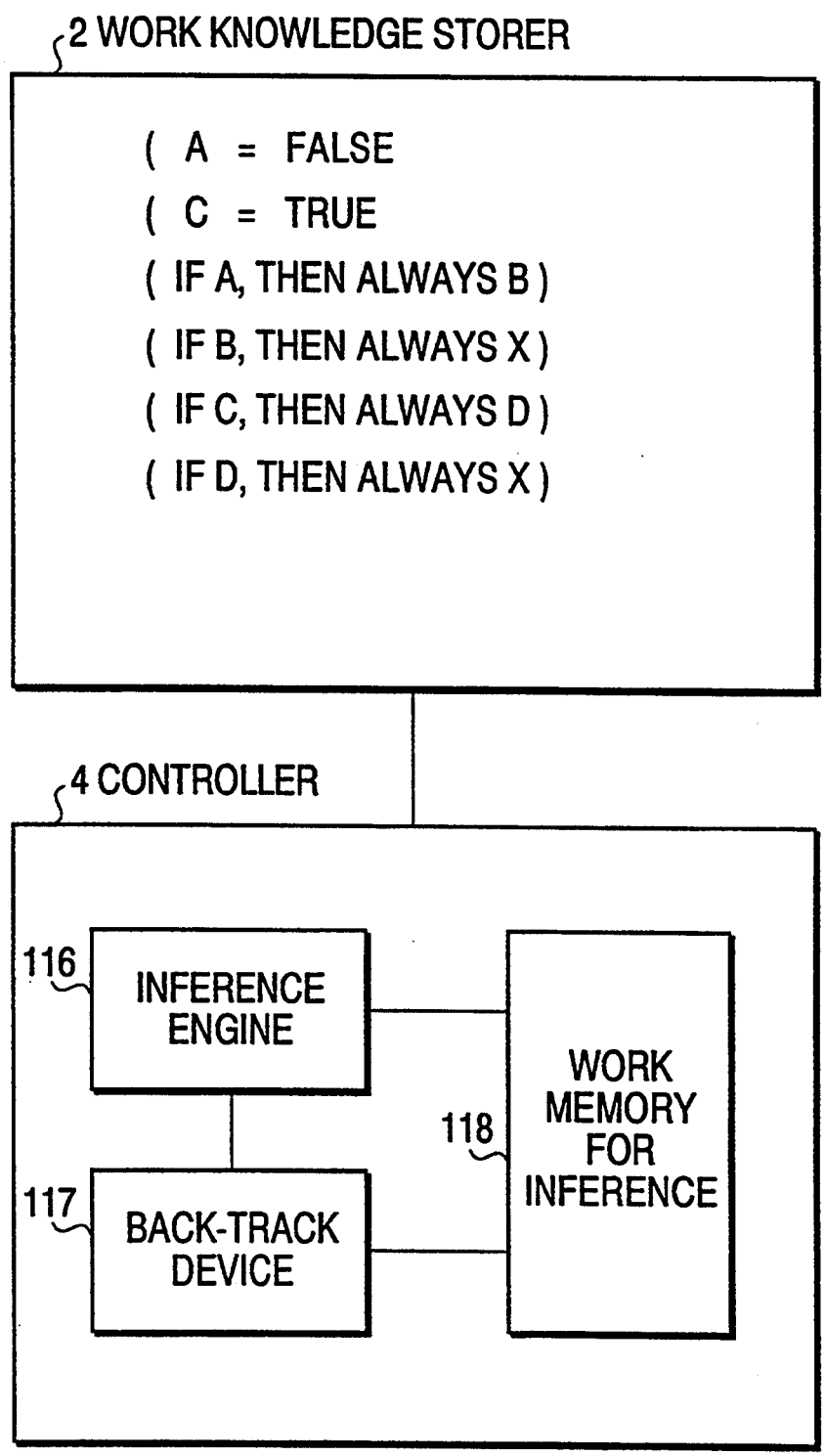
FIG. 14 is a block diagram showing an arrangement of an embodiment having a back-track device.

FIG. 14 is a block diagram showing the arrangement of an embodiment provided with a back-tracking device.

As shown in FIG. 14, the work knowledge storer 2 stores therein data ① and data ② and rules ③ through ⑥.

An inference engine 116 within the controller executes a backward inference in order to prove X=true. More specifically, since X lies on the right-hand side of rule ④, the inference engine 116 infers that B is true. Also, since B lies on the right-hand side of rule ③, the inference engine 116 infers that A is true. However, they are not coincident with data because of the data ①, and the inference engine 116 fails in its inference. At this time, the back-tracking device 117 returns the content of an inference work memory 118 varied in the process of the above-mentioned inference and makes an inference for the next case. In that case, since a result C is true, D becomes true so that an inference result in which X becomes true is derived.

Figure 15:
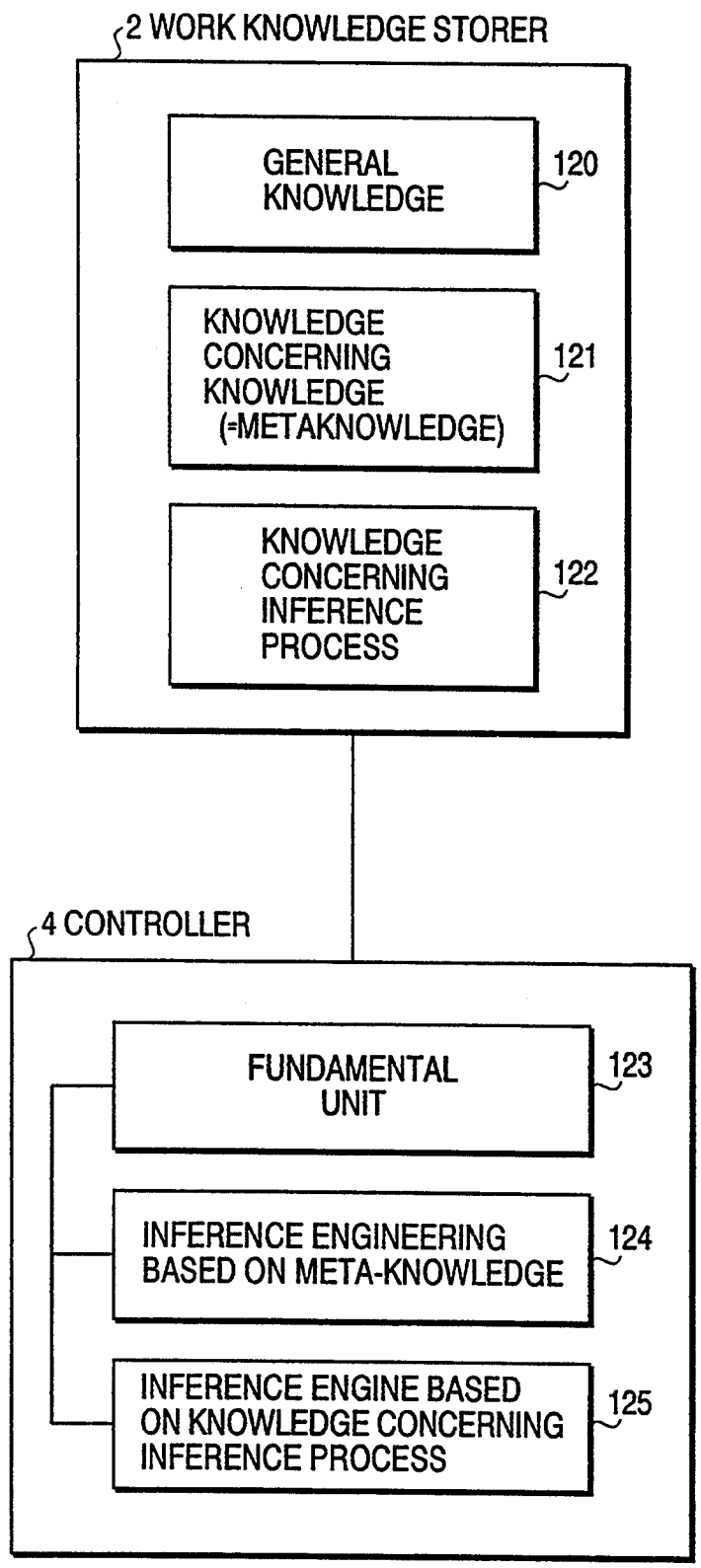
FIG. 15 is a block diagram showing an arrangement of an embodiment having a meta-knowledge and a knowledge concerning an inference process.

FIG. 15 is a block diagram showing the arrangement of an embodiment in which processing based on meta-knowledge and processing based on a knowledge concerning the inference process are executed.

As can be seen in FIG. 15, the work knowledge storer stores therein general knowledge 120 concerning a processing object, knowledge concerning knowledge itself, i.e., meta-knowledge 121 and knowledge 122 concerning an inference process, and a controller comprises an inference engine 124 based on the meta-knowledge and an inference engine. 125 based on the knowledge concerning the inference process.

Let it be assumed that the meta-knowledge 121 includes knowledge, i.e., metaknowledge, in which once a rule whose description begins, for example, when a symbol a is executed, such a rule cannot be executed again in the inference. Then, when the inference engine 124 based on the metaknowledge decodes this metaknowledge, the fundamental unit 123 carries out such control for the inference using the general knowledge 120 by using the information of the decoded metaknowledge.

Further, let it be assumed that knowledge expressed by (max−rule=10000) in which an abnormal end is effected if the rule executed in the inference 10,000 times or more is stored as the knowledge 122 concerning the inference process. When the inference engine 125 based on the knowledge concerning the inference process decodes that knowledge, then the fundamental unit 123 executes such control on the inference using the knowledge 120.

Figure 16:
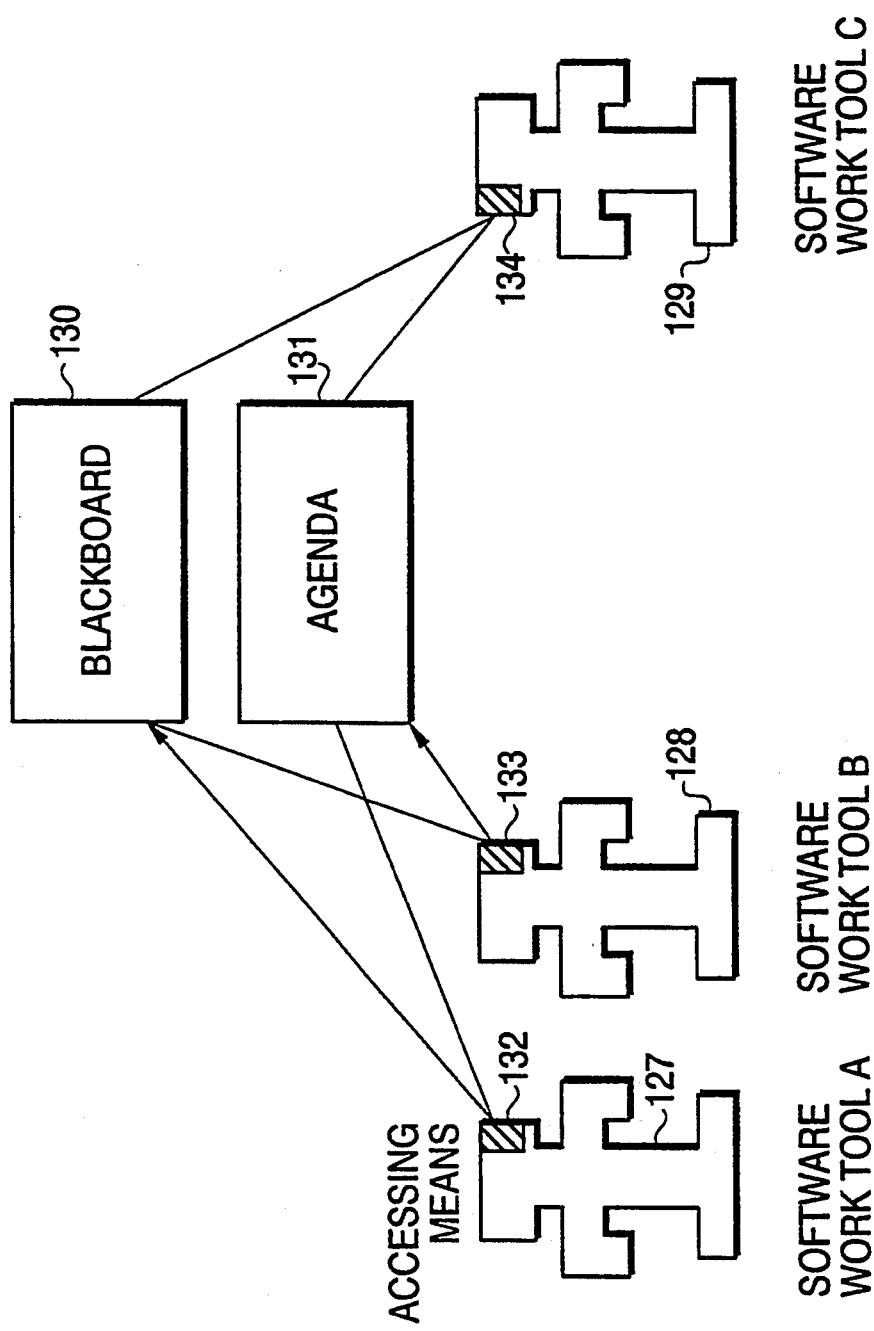
FIG. 16 is a schematic diagram showing an embodiment of a cooperation processing done among a software work tool group having a blackboard and an agenda.

FIG. 16 is a block diagram showing the arrangement of an embodiment which utilizes a blackboard and an agenda.

As shown in FIG. 16, three software work tools 127, 128 and 129 are generated in the inference process, and cooperate with one another in inference by using a blackboard 130 provided as a memory in which information used in the inference are written and an agenda (i.e., memorandum) provided as a memory in which information concerning a solved problem and an unsolved problem are written. The respective software work tools 127, 128 and 129 include accessing means 132, 133 and 134 for accessing the blackboard 130 and the agenda 131.

As shown in FIG. 16, if the software work tool 127, for example, reserves a seat and writes a reservation date, a car number and a seat number in seat data On the blackboard 130, then the software work tool 129 immediately starts to calculate the charge on the assumption that the software work tool 129 has a rule for calculating a charge on the basis of the seat data, and writes charge data in the blackboard 130. Then, in response thereto, the software work tool 128 transmits seat data and charge data to a terminal of a station. Thus, the work is executed by the cooperation of the software work tools 127, 128 and 129 as described above.

Also, the cooperative work is executed as follows. If the software work tool 128 writes "want to obtain seat data" and "want to obtain charge data" in the agenda 131, then the software work tool 127 reserves a seat and the software work tool 129 calculates a charge and rewrites the problem on the agenda 131 as a solved problem.

Figure 17A:
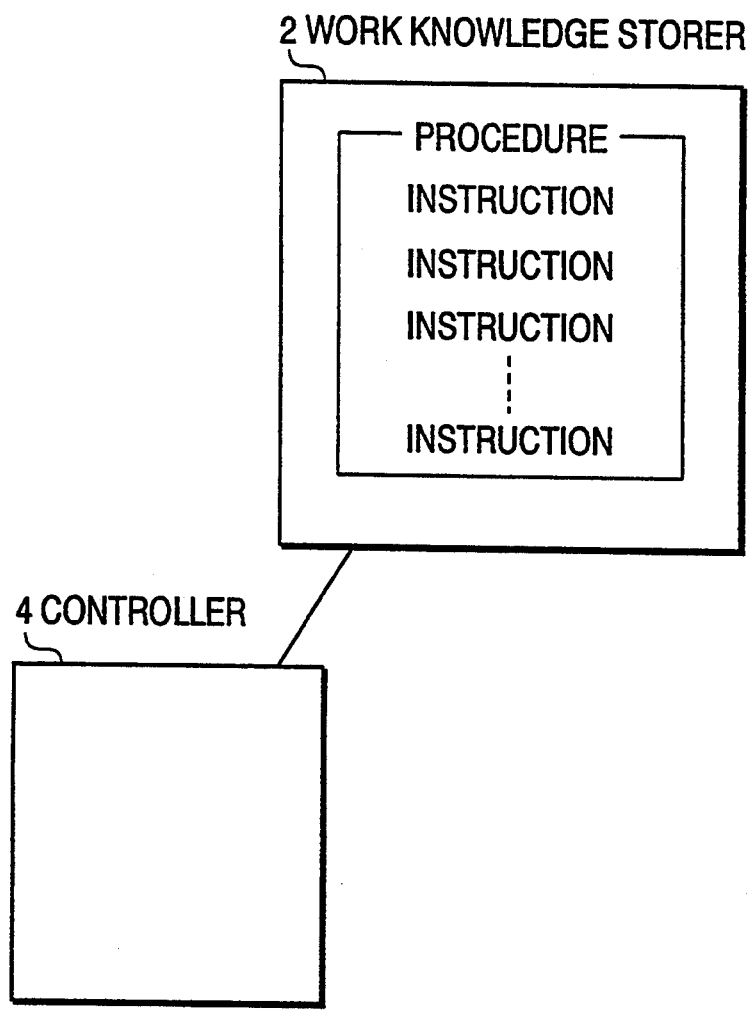
FIG. 17 is a schematic diagram showing an embodiment in which a work knowledge storer is provided with a procedure description.

FIG. 17 is a block diagram showing the arrangement of an embodiment in which the work knowledge storer includes a procedure description indicative of work. As shown in FIG. 17A, the work knowledge storer stores a procedure. The procedure describes work in the form of instructions arranged in a sequence and the controller 4 sequentially executes them.

Figure 17B:
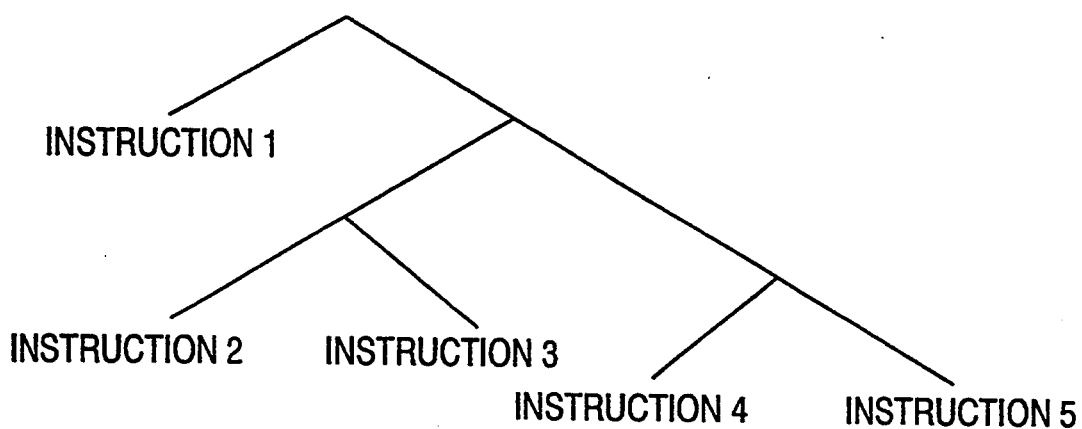

In particular, when the procedure is provided in the form of the tree structure shown in FIG. 17B, the instructions are executed in the sequence of instruction 1, instruction 2, instruction 3, instruction 4 and instruction 5, according to the rule.

FIG. 18 shows an embodiment in which the work knowledge storer includes information input in the format of a logic chart diagram. As shown in FIG. 18A, a logic chart diagram 140 is supplied to the work knowledge storer 2 as information whose format is converted by a converter 141, i.e., by a procedure 142. The logic chart diagram 140 graphically illustrates the processing flow as shown in FIG. 18B and this logic chart diagram 140 is equivalent to procedure knowledge shown in FIG. 18C.

Instead of the above embodiment in which the software work tool includes the converter 141 and the converter 141 converts the input logic chart diagram into the procedure knowledge 142 and stores the same into the work knowledge storer 2, a variant of this embodiment may be considered as follows. The logic chart diagram 140 is not converted, but is directly stored in the work knowledge storer 2 and the controller of the software work tool carries out the condition decision, the repetition and the instruction execution in accordance with the logic chart diagram 140.

Figures 19A, 19B, 19C:
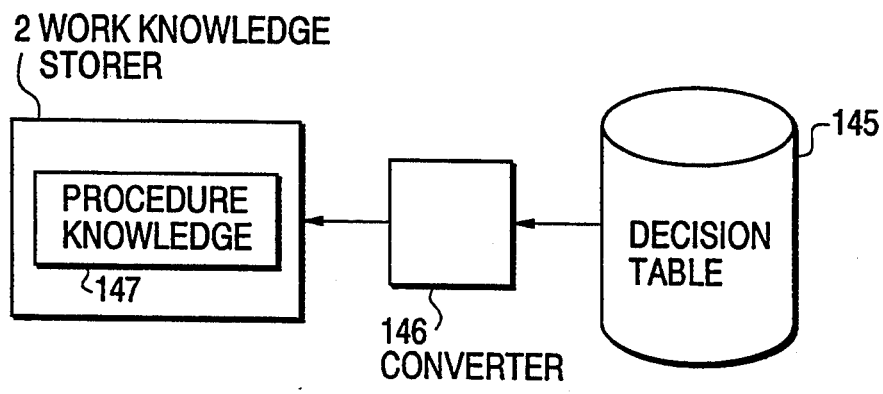
FIG. 19 is a schematic diagram showing an embodiment in which the work knowledge storer is provided with a knowledge input in the format of a decision table.

FIG. 19 shows an embodiment in which the work knowledge storer includes information input in the format of a decision table. In this embodiment, as shown in FIG. 19A, information input in the format of a decision table 145 is converted into procedure knowledge 147 by a converter 146 and stored in the work knowledge storer 2. As shown in FIG. 19B, the decision table 145 shows combinations of condition decision and instruction execution in the form of a table. In the decision table 145, one case is illustrated in a column, where Y represents a YES and N represents a NO. The first column shows that, when conditions 1 and 2 are YES, only instruction 1 is executed. Diagram in FIG. 19C shows that the decision table shown in FIG. 19B is converted into procedure knowledge.

Instead of the above embodiment in which the converter 146 of the software work tool converts the decision table 145 into the procedure knowledge 147, a variant of this embodiment may be considered as follows. The decision table 145 is directly stored in the work knowledge storer 2 and the controller of the software work tool carries out the condition decision and the instruction execution in accordance with the decision table 145.

FIG. 20 shows an embodiment in which the work knowledge storer includes information input in the format of a state transition diagram. In FIG. 20A, information input in the format of a transition diagram 150 is converted into a rule 152 by a converter 15 and then stored in the work knowledge storer 2. The state transition diagram is a diagram of the format such that, as shown in FIG. 20B, the state of a certain thing is represented by an open circle, the state transition is represented by an arrow and the condition and the processing in the transition are described on the side of the arrow. A rule statement shown in FIG. 20C is equivalent to the state transition diagram shown in FIG. 20B.

Instead of the embodiment in which the input state transition diagram 150 is converted into the rule knowledge 152 by the software work tool converter 151, such a variant of the embodiment may also be considered, in which data of the state transition diagram is directly stored in the work knowledge storer 2 and the controller 4 of the software work tool carries out the condition decision and the instruction execution in accordance with the state transition diagram.

FIG. 21 shows an example of knowledge in the embodiment in which the work knowledge storer stores information of a list structure, a tree structure or a graph structure as knowledge. Diagram in FIG. 21A shows an example of data of the list structure wherein data A, B and C are arrayed in that order. The diagram in FIG. 21B shows an example in which data is converted in the format indicating the list structure.

Diagram in FIG. 21C shows an example of knowledge of the tree structure, in which data A, B, C and D are provided in the form of lists, which might be called a tree structure because the list is branched like a tree diagram in FIG. 21D shows an example in which data in of FIG. 21C is converted into the format indicating the tree structure.

Diagram in FIG. 21E shows an example of knowledge of the graph structure, in which branches are extended from arbitrary nodes. Diagram in FIG. 21F shows an example in which the knowledge in of FIG. 21E is converted into the format indicating the graph structure.

When the software work tools described in detail above are used, it becomes crucial to interlink them across multiple systems.

Figure 22:
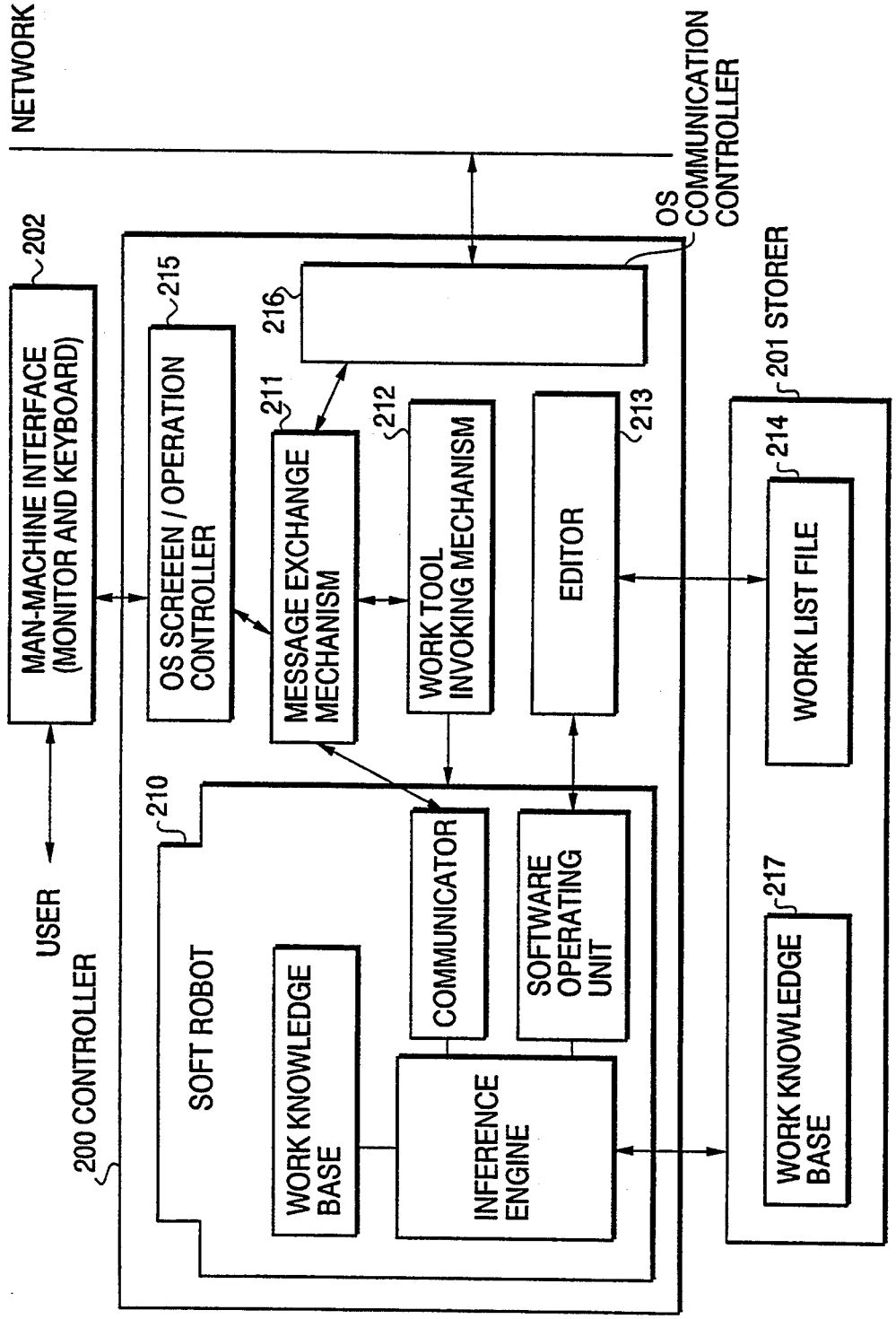
FIG. 22 is a block diagram of one of a number of computer systems in an embodiment for their coordination.

FIG. 22 is a block diagram of an embodiment of a computer system for performing such interlinked operations.

FIG. 22 shows the configuration of one of the multiple computer systems connected through the network. This system comprises a controller 200, a storer 201, and a man-machine interface 202 including a monitor and a keyboard.

The controller 200 comprises a soft robot 210 as a software tool of this invention, the message exchange mechanism 211 described earlier, a software tool booting-up mechanism 212, an editor 213 as a system editing program, a screen/operation controller 215 for an operating system (OS), and a communication controller 216 for the operating system (OS). The storer 201 internally stores both a work list file 214 for storing works performed by the soft robot 210, which are searched by editor 213, and a work knowledge base 217 as an external memory for the work knowledge base within the soft robot 210.

As shown in FIG. 22, the software work tool, i.e. the soft robot 210, is highly versatile having the ability to standardize the representations of its work irrespective of the computer model or the kind of operating system (OS). It is apparent from the examples of character codes that different computers express data differently. However, an appropriate intermediary can interlink different expressions, e.g. by a character code conversion process, across computers.

An automatic operation of such a conversion tool by the software work tool, i.e. a soft robot 210, enables the data formats exchanged on the network to be uniform. An automatic exchange of uniform format data, e.g. by the message exchange mechanism 211, into those conforming to the home system computer format, when respective soft robots receive them or send them to the network, enables the data to be processed according to the format used by the home system.

Alternatively, it is possible to standardize the data handled by soft robots, such that the software operators in the soft robots convert the standardized data into formats conforming to the operating system of the home system computer.

As described above, this invention is distinguished by its ability to describe work knowledge by masking dependency on a computer model or its operating system. Thus, it has an epoch-making significance as a means of executing software in a distributed environment comprising different computer models.

Figure 23:
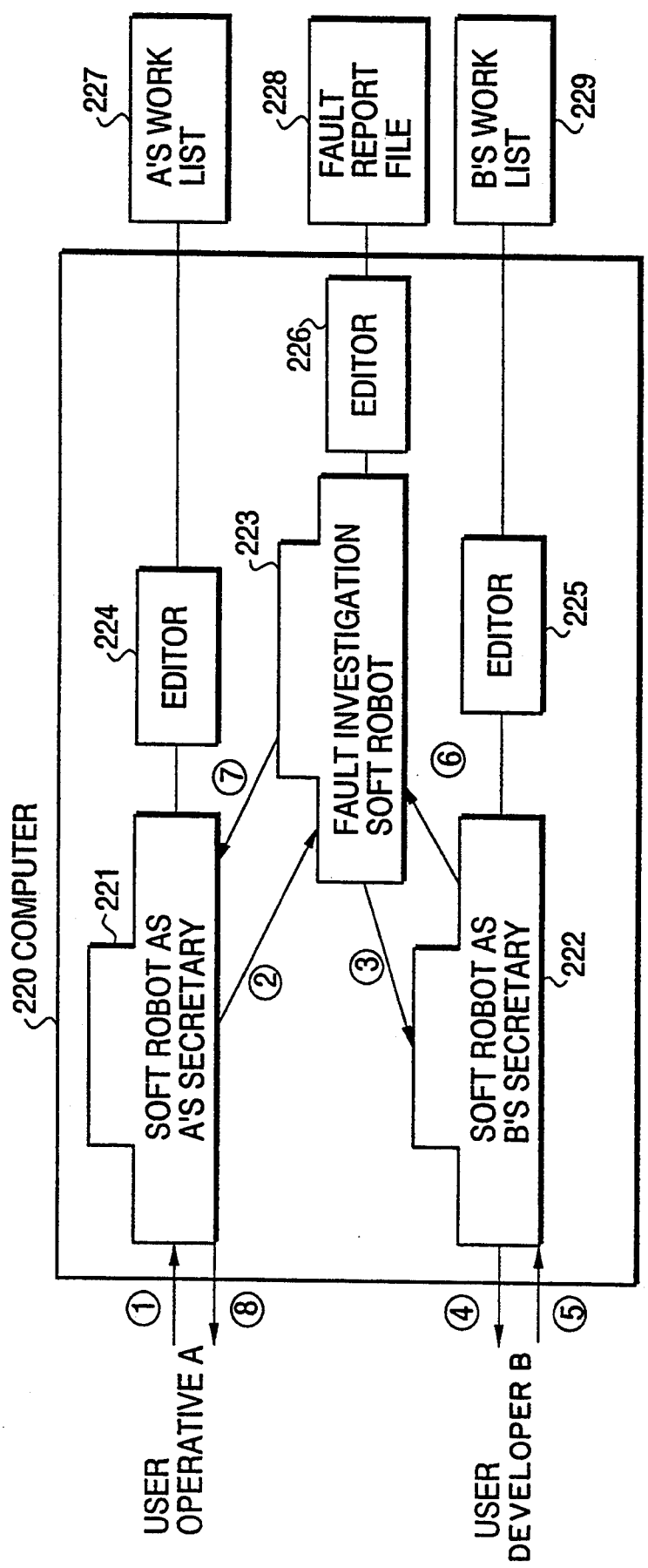
FIG. 23 shows an actual application of this invention.

A further application of this invention is described in detail by referring to FIG. 23.

FIG. 23 shows the usage of the soft robot when an operative A manipulating the computer system 220 finds a fault therein and asks a developer B to investigate the matter within the same system 220.

As shown in FIG. 23, upon finding an abnormality, the operative A asks the soft robot 221 as his/her personal secretary for a fault investigation in [1]. The soft robot 221, as A's secretary, calls from a software operator a software tool called an editor 224 as an editing program, adds a work item, and receives a notification from the editor 224 of a normal termination.

The soft robot 221, as A's secretary, gives a fault investigation soft robot 223 the information from the operative A in [2] and asks for the fault investigation. Upon receiving the request for the fault investigation, the fault investigation soft robot 223 returns a response of a normal request reception to the soft robot 221 as A's secretary.

The fault investigation soft robot 223 creates a fault report file 228 by using an editor 226. It tries to analyze the contents of the fault from its own knowledge. However, it cannot sufficiently analyze the contents, so it asks the developer B for help. Then, the fault investigation soft robot 223 sends a message to a soft robot 222 as B's secretary in [3] requesting B's assistance.

The soft robot 222, as B's secretary, finds B's schedules from B's work list 229 by using an editor 225. If it is found that B has spare time, editor 225 notifies the fault investigation soft robot 223 of the acceptance of the fault investigation request.

The soft robot 222, as B's secretary, calls up the computer immediately if it is already logged on to it. Otherwise, it logs on to the computer and then the soft robot 222, as B's secretary, notifies the content of a work request, i.e. fault investigation, in [4]. At the same time, the soft robot 222, as B's secretary, adds the fault investigation to B's work list 229 by using the editor 225.

The developer B analyzes the fault phenomenon to find the cause and plans the correction. Upon completion, the developer B notifies the soft robot 222, as B's secretary, of the solution for the fault in [5]. The soft robot 222, as B's secretary, writes to B's work list 229 the results of the fault investigation work by using editor 225. These data are stored for future reference.

The soft robot 222, as B's secretary, notifies the fault investigation soft robot 223 in [6] of the normal completion of the fault investigation and sends information regarding the cause of the fault and the necessary corrective action. The fault investigation soft robot 223 writes to a work report file 228 the cause and correction by using editor 226. The fault investigation soft robot 223 sends to the soft robot 221 as A's secretary a message that the operative A who requested the work return an acknowledgement in [7]. After sending the fault report to the soft robot 221 as A's secretary, the fault investigation work is completed.

The soft robot 221, as A's secretary, shows a fault report to the operative A in [8] and confirms A's satisfaction by the result to determine the completion of A's fault investigation work. The soft robot 221, as A's secretary, writes to a column of the fault investigation work in A's work list 227 the work completion by using editor 224. These data are stored for future reference.

As described above, the use of a soft robot as a software work tool of this invention enables the soft robot to retain the knowledge corresponding to the fault investigation. This makes it possible, for instance, for the fault investigation soft robot 223 to make a request to C when the developer B is absent. Also, because a fault, report file is created, if similar kinds of subsequent faults are created, they can be handled automatically.

In addition to the embodiments described in detail above, the following embodiments may be considered:

an embodiment in which the work knowledge storer 2 includes an inference rule or fact involving an expression of ambiguity or confidence or probability or uncertainty except true or false value in order to derive the work procedure, and the above-mentioned controller 4 includes therein an inference engine for executing an inference engineering (involving fuzzy inference and inference with confidence) on the basis of the inference rule or fact;

an embodiment in which the work knowledge storer 2 includes an inference rule or fact involving an expression of inevitability and accident or an expression of true or false on the time base in order to derive the work procedure, and the above controller 4 includes therein an inference engine which executes an inference engineering (inference based on modal logic or tense logic) based on the inference rule or fact;

an embodiment in which the work knowledge storer 2 includes an inference rule or fact involving an expression such that a variable range is classified into a range in which the variable falls in order to derive the work procedure and the above controller 4 includes therein an inference engine which executes an inference engineering (qualitative inference) based on the inference rule or fact;

an embodiment in which the observer 5 or the work knowledge storer 2 or the communicator 3 or the controller 4 includes a pattern recognition device or information processing device which imitates a nerve cell of brain nervous system (i.e., neuro simulator);

an embodiment in which the software operator 1 includes means for operating the hardware via a software provided by a system (i.e., an operating system);

an embodiment in which the observer 5 includes means for observing the hardware via a software provided by a system (i.e., an operating system);

an embodiment in which in an information processing apparatus housed in a mechanical apparatus similar to a robot or in an information processing apparatus for controlling the robot from outside the software operator 1 or the communicator 3 includes means for outputting information for operation of the robot or the state change of the robot or for output from the robot to the external world through a control program of the robot;

an embodiment in which in an information processing apparatus housed in a machine apparatus similar to a robot or in information apparatus for controlling the robot from outside the above observer 5 or the communicator 3 includes means for inputting a state observed by the robot from the external world or the state of the robot through the control program of the robot;

an embodiment which includes a timer for transmitting an interrupt signal to the above controller 4 when a certain time is passed for control;

an embodiment which includes a clock for holding date or day-of-week or time and to which the above controller 4 can input data;

an embodiment which includes a watchdog timer for receiving a signal from the above controller 4 of the software work tool at a predetermined time interval in the normal state and for transmitting an interrupt signal to the controller 4 or forcing the controller 4 to be disabled in response to a signal indicating an elapse of time if no signal is transmitted thereto from the controller 4 after a predetermined time has passed because an abnormality occurs in the processing of the controller 4;

an embodiment in which said software operator 1 includes means for performing creation, addition, deletion, alteration, correction, replacement, division, merging, copying, transfer or similar operations on a part of the software work tool itself;

an embodiment in which said observer 5 includes means for performing access, comparison, listing, investigation, diagnosis or similar observations on a part of the software work tool itself;

an embodiment in which the software operator 1 includes means for creation, addition, multiplication, activation, stopping, freezing, defrosting, deletion, alteration, correction, replacement, division, merging, copying, transfer of a similar software work tool except its own software work tool or similar operations;

an embodiment including a memory device (i.e., a stack) for transmitting state data of the request side from the work knowledge storer 2 and storing the same prior to the request in order to continue front and rear works correctly when its own software work tool is directly or indirectly requested (i.e., recursive call) and transferring the state data to the work knowledge storer 2 one more time to recover the same after the requested work has been finished;

an embodiment including information input apparatus for inputting information from a user or operator and said work knowledge storer 2 including means for describing the processing of the input information from the information input apparatus, and an embodiment in which the above communicator 3 includes at its front stage a device for integrating information format in order to process a communication similarly to the communication with the user or operator when information communicated to the above communicator 3 is a communication from its own and other similar software work tools;

an embodiment including information output unit for outputting information to a user or operator and in which the work knowledge storer 2 includes means for describing a method of outputting information to the information output apparatus, and an embodiment in which the communicator 3 includes at its succeeding stage a device for converting an integrated information format into an expression format addressed to a human being only when information is output to the user or operator in order to process the communication similarly to the communication with the user or operator if information communicated via the communicator 3 is a communication with its own and other similar software work tools;

an embodiment including a name, a nickname, a symbol, a frame display, a coordinate, a face, a figure, sound information or voice information for identifying its own software work tool from another software work tool so that the information can be transmitted to the communicator 3 or displayed to the user or operator;

an embodiment in which the work knowledge storer 2 includes information concerning the fact that its own software work tool has a function, a using method, a using example or a using record different from those of other software work tools so that the information can be transmitted to the communicator 3 or displayed to the user or operator;

an embodiment in which the work knowledge storer 2 includes information concerning a function, a using method, a using example or a using record of a software to be operated by the software operator 1 so that the information can be transmitted to the communicator 3 or displayed to the user or operator;

an embodiment in which the work knowledge storer 2 includes information concerning a using method of a software to be operated by the software operator 1 and the controller 4 decides the next instruction in accordance with the information concerning the using method;

an embodiment in which the work knowledge storer 2 includes therein information concerning a plurality of software groups to be operated by the software operator 1 and the controller 4 selects a software to be operated on the basis of the information and instructs the software operator 1 to operate the software properly;

an embodiment having a temporary storage area for executing work, an embodiment including means (i.e., a dump) for outputting the contents of the temporary storage area to another storage device when a fault occurs or when the user instructs an investigation and a further embodiment including means for processing information by accessing the dump;

an embodiment including means (i.e., a dump) for outputting the content of the work knowledge storer 2 to another storage device when a fault occurs or when the user instructs an investigation and a further embodiment including means for processing information by accessing the dump;

an embodiment including means (i.e., log or trace) for recording an instruction treated by the controller 4, information treated by the above instruction, a place of instruction or a completed state of instruction in another storage device in order to understand details of a processing, or a further embodiment having means for processing information by accessing the log or trace;

an embodiment including means (i.e., a snap) for pausing the above controller 4 and recording an instruction, information treated by the instruction, an place of instruction or a completed state of instruction in another storage device when an instruction is issued in order to understand details of the processing or when a logic condition is satisfied, or a further embodiment including means for processing information by accessing recorded information such as a snap or the like;

an embodiment in which the software operator 1 accesses the operating system to request the operation for software on its own and other an information processing apparatuses;

an embodiment in which the observation unit 5 accesses the operating system to request an input, to supervise or to send information on its own, and other an information processing apparatuses;

an embodiment in which the communicator 3 includes means for communicating with a similar software work tool on other an information processing apparatuses;

an embodiment in which the software operator 1 connects a device for accessing a software tool which describes or evaluates the system arrangement by combining devices or softwares; a software tool which describes or evaluates performance, scale, capacity, reliability, work planning, schedule or cost of the system; or a software tool in which terms, concept, data, a relation between data, function, processing, picture, document, telegram or knowledge necessary for realizing a business are stored, processed, analyzed, converted, displayed or printed and which executes a part of the system design or analyzing work;

an embodiment in which the software work tool 1 connects a device for accessing a software tool for creating a more detailed specification description from a program specification description; a software tool for creating a program or an environment definition from a specification description; a software tool for extracting a specification description from a program; or a software tool for checking, displaying or printing the specification description, the program or the environment definition, and executes a part of software development work;

an embodiment in which the software operator 1 connects a device for supervising a program activation condition, preparing program input information or program control information, activating a program, supervising a program state, sending information to a program, forcing the program to be stopped, changing a program's priority, recovering a program when an abnormality occurs, judging an executed result of a program or analyzing output information of a program, and executes a part of software operation work;

an embodiment in which the software operator 1 connects a software tool which checks a program or environment definition varied in association with the change of a program or environment definition, a software tool which changes a program or environment definition varied in association with the change of a program or environment definition, a software tool which changes an associated program or environment definition when a specification description is changed or a software tool which changes a specification description when the program or environment definition is changed and executes a part of software maintenance and an expansion work;

an embodiment in which the software operator 1 connects a device for accessing a software tool which extracts a specification description from a program of the present system or a software tool in which the specification description of the present system; inputs and converts program or information (i.e., a conversion) into a specification description of a newly developed system, a program or information; and then outputs and executes a part of software converting work;

an embodiment in which the software operator 1 connects a device for accessing a software system introduction and management tool or a customized tool in which software are adjusted for customers and executes a part of software introducing work;

an embodiment in which the software operator 1 connects an accessing and updating device for accessing and updating a data base having a specific structure, a file, an image file, a voice file or a specific file and executes a data input and output processing or treatment processing;

an embodiment in which the software operator 1 or the communicator 3 communicates with a telephone, a facsimile, a word processor, a teleconference, a so-called pocket bell, a terminal, an electronic switcher or a similar network appliance;

an embodiment in which the communicator 3 communicates with a software work tool having only a controller and a work knowledge storer without a software operator, regardless of whether or not it has a similar communicator, to thereby obtain a part of knowledge or a calculated value from the software tool;

an embodiment including another software work tool creating device for creating or erasing later a similar software work tool (i.e., another software work tool) when work increases;

an embodiment including another remote software work tool creating device for creating or erasing later a similar software work tool (i.e., another software work tool) on another an information processing apparatus when the other an information processing apparatus different from the activated information processing apparatus need be operated;

an embodiment including a remote transmission device for transmitting its own information to an information processing apparatus, recovering later or erasing later the same when another an information processing apparatus different from the activated information processing apparatus need be operated;

an embodiment in which the work knowledge storer 2 includes knowledge concerning a method of preparing a work environment and executes work for an environment preparation prior to the main work;

an embodiment in which the work knowledge storer 2 stores a rule, a fact or other knowledge concerning a work planning method and planning details composed of a work method, a work order or a logic execution condition forming the work or evaluating the plan prior to the work;

an embodiment in which the work knowledge storer 2 includes a rule, a fact or other knowledge concerning a work supervisory method, work executed by the software operator 1 or another similar software work tool via the communicator 3 is observed by the above communicator 3 or by the observer 5 and the controller 4 executes the control on the basis of an observed result;

an embodiment in which the controller continues a process requiring no answer until an answer of an item requested of another similar software work tool, the user or the operator via the communicator 3 is obtained and executes a process requiring the answer when the answer is obtained;

an embodiment in which a timer detects that an answer concerning an item requested of another similar software work tool, the user, or the operator via the communicator 3 is not obtained during a predetermined period of time and the controller inquires again, demands or regards the requested item as an abnormality;

an embodiment in which a format permitted as information received by the communicator 3 or information concerning the meaning of the information is stored in the work knowledge storer 2, the checking or analysis of the meaning is executed upon reception on the basis of the format information or the meaning information and a corresponding process is executed on the basis of the analyzed result;

an embodiment in which the software operator 1 or the work knowledge storer 2 includes a data base (i.e., an object-oriented data base) which manages en bloc a variety of data as an integrated unit (i.e., an object) of data and processing;

an embodiment including a device (i.e., a device for generating software work tool B asked on an object orientation) for generating the content of at least the work knowledge storer 2 from the content of a work knowledge storer of a more general software work tool of the software work tool by carrying out the succession (i.e., the inheritance);

an embodiment in which the work knowledge storer 2 includes remote command and a corresponding method of operation for operating the software by the software operator 1 in accordance with information (i.e. a remote operation command) received at the communicator 3 in order to operate the software by a command from a remote place connected by a line or other places such as space, or a further embodiment including the observation unit 5 to transmit input information to a remote place;

an embodiment in which the work knowledge storer 2 includes a necessary data group and a set of operations to be executed when the data are prepared and the above controller 4 determines whether or not the necessary data are prepared and a device (data flow computer) activates the operations sequentially or in parallel;

an embodiment including a power supply control device for switching on an information processing apparatus which is operated instead of a communicator to thereby activate the controller 4 when information is received by the above communicator 3;

an embodiment including a power supply control device for executing a process after a predetermined period of time when information is received by the above communicator 3 and for switching off a power switch of an information processing apparatus whose software work tool is being operated;

an embodiment including a power supply control device for counting time with a timer or clock and switching on a power switch of an information processing apparatus at a predetermined time;

an embodiment in which a receiving unit of the above communicator 3 is activated by a designating (i.e., call) operation for the software work tool from an external program to receive information of a call parameter prepared in the external program or a transmitting unit executes a transmission by varying a value of a call parameter activating the transmitting unit of the above communicator 3 or by a return value to thereby execute a return operation to the external program;

an embodiment (i.e., a nested arrangement) in which components may include a similar software work tool, or a further embodiment in which an internal software work tool is dynamically created or erased or a software work tool including its own software work tool is dynamically created or erased at its outside;

an embodiment in which a common content of the work knowledge storer 2 or the controller 4 of at least a plurality of software work tools is stored in the only storer and made common to the software work tool groups and individual contents of at least the work knowledge storer 2 include storage for respective software work tools in a one-to-one relation, thereby enabling a common unit to be operated in a re-enterable fashion;

an embodiment, including a log file, a log acquisition device and a recovery device in an external storage unit, wherein the log acquisition device properly writes a changed content of a storage device allocated at least by the work knowledge storer 2 in the log file and the recovery device reads out the changed content from the log file when the software work tool resumes the processing after the software work tool has paused the process due to some fault to thereby recover the work knowledge storer, or a further embodiment in which a recovery process for an external software is executed by the software operator 1;

an embodiment including a log file, a log acquisition device and a back out device in an external storage unit, wherein the log acquisition device properly writes a changed content of a storage device allocated at least by the work knowledge storer 2 in the log file and the back out device reads out the changed content from the log file when the software work tool cancels the integrated processing due to some fault to thereby recover (i.e., back out) the work knowledge storer, or a further embodiment in which a back out processing for an external software is executed by the software operator 1;

an embodiment including a log file and a log acquisition device in an external storage unit, wherein the log acquisition device writes uptime statistical information, accounting statistical information, performance statistical information or security control information in the log file in accordance with the processing of the software work tool, or a further embodiment in which the information is input by the software operator 1, or an embodiment having the observation unit 5 wherein the information is input by the observation unit 5;

an embodiment in which a plurality of software work tools include converting devices for converting information when the respective communicators 3 thereof communicate information of different formats or of different meanings;

an embodiment in which the above observer 5 connects means for inputting from the outside a load (i.e., availability) of a component of an information processing apparatus, a using amount of a storage device or a buffer memory, a processing speed of software work, a wait condition of work request information for the software work tool, a component of the an information processing apparatus or a component fault condition of the software work tool;

an embodiment including information (i.e., a HELP file) which answers when the user asks for an operation method and in which the content of the HELP file is answered when the user questions via some route;

an embodiment which accesses or updates, in accordance with a proceeding of control, name management information, relating information, software resource management information, a directory, a catalog file, a data dictionary, a data directory, an integrated resource management dictionary, information repository, an object manager, an object server, a name server, a concept dictionary, a function dictionary, a terminology dictionary, an item dictionary, an electronic dictionary, a kana-kanji conversion dictionary, a language translation dictionary or similar dictionaries provided on the outside;

an embodiment including a document processing unit for the above software operating unit 1 wherein a document is created, edited, displayed or printed out by the document processing unit; or a document is input, analyzed or understood by the software operating unit 1 or by the observation unit 5, or a further embodiment in which a printing apparatus, a word processor or a copying apparatus is connected to the document processing unit so that they can be operated in a linked configuration;

an embodiment including an analysis unit linked to the above software operating unit 1, wherein a content of a display file, which is output in a two-dimensional array from an external software for the user, is analyzed without the interposition of a user or with the decreased interposition of a user, and an analyzed result is sent to the controller;

an embodiment including a key information composing unit linked to the above software operating unit 1, wherein a content of an input file, which is requested in a one-dimensional array by an external software in order to read a user's key input, mouse input or touch input, is composed without the interposition of a user or with the decreased interposition of a user, and a composed result is sent to the external software;

an embodiment including a field input information composing unit linked to the above software operator 1, wherein a content of an input file, which is requested in a two-dimensional array by an external software in order to read information generally input to an area (i.e., field) of a picture by the user, is composed without the interposition of a user or with the decreased interposition of a user and a composed result is sent to the external software;

an embodiment in which the above software knowledge storer 2 includes version information of the work knowledge or further a plurality of work knowledge of different versions;

an embodiment including an external display device, wherein input and output of at least the software work tool group are separately allocated to a plurality of windows forming a part of the display screen of the display device;

an embodiment in which the work knowledge storer 2 includes a plurality of descriptions of information constraint between blocks of information and the above controller 4 includes a constraint process unit for executing a process on the basis of the constraint;

an embodiment in which communication information, work request information or a work result when a work is executed is stored in the above work knowledge storer 2 and returns the information (i.e., example) to a question from a user who executes new work, or a further embodiment in which the user executes a selection and a correction from the example, or a further embodiment in which the difference between the example and the new work is judged so as to minimize conversation between it and the user;

an embodiment in which communication information, work request information or a work result when a work is executed is stored in the above work knowledge storer 2 and utilized as knowledge on the work for a new work (i.e., learning function);

an embodiment including natural language processing unit connected to the above communicator 3, wherein a conversation is conducted between the users or between similar software work tools by means of a natural language, and a further embodiment including voice and thought connected to the natural language processing unit, wherein a conversation is conducted between the users or between similar software work tools by means of voice; and an embodiment including a feeling storer connected to the above controller, wherein the feeling storer includes a variable imitating a feeling concept similar to joy and sorrow of human beings, a feeling variable is varied on the basis of a work processing information in accordance with the proceeding of control, the feeling variable is accessed in accordance with the proceeding of control and the feeling storer activates the controller so that the controller selects at least a display of shape of face, expression of words or expression of voice from information displayed via some route by effectively utilizing the value of the feeling variable.

As set out in detail above, according to this invention, it becomes possible to provide a general purpose software work tool in which software operations can be executed automatically on the basis of information concerning the work in the development and operation of the software, and in which the work can be made independent and minimized by creating the information concerning work in a self-distributed fashion.

In comparing the software work tool of this invention to a human being, it should be noted that the work knowledge storer and the controller correspond to a person's brain, the communicator corresponds to his mouth and ears, the software operator corresponds to his hands and the observer corresponds to his eyes. As described above, according to this invention in which the software work tool is arranged as a robot in the software world, a device in which the software is produced and the software work tool is operated by this software in the an information processing apparatus as if a robot produced and operated the machine in the factory becomes possible from a man's work standpoint. On this basis, research results of AI technology or the application of such as a distributed processing technology becomes very effective. It is expected that the application field of this invention will be rapidly extended in the future and therefore this invention may contribute greatly to the development of the an information processing apparatus.

Although preferred embodiments of this invention have been described in detail with reference to the accompanying drawings, it is to be understood that the invention is not limited to these precise embodiments, and that various changes and modifications may be effected therein by one skilled in the art without departing from the scope or spirit of the invention as defined in the appended claims.

What is claimed is:

1. A software work tool in an information processing apparatus comprising:

work knowledge storer means for storing work knowledge information;

software operating means for carrying out operations on a plurality of programs based on said stored work knowledge information;

communicator means for transmitting and receiving communication information including work requests and work reports to and from said software work tool and at least one additional external software work tool, thereby enabling said software work tool and said at least one additional external software work tool to cooperate with each other during an operation on said plurality of programs;

controller means for controlling said software operating means, said communicator means and said work knowledge storer means based on said work knowledge information stored in said work knowledge storer means; and observation means for observing said programs operated on by said software operating means comprised within said software work tool and for observing programs operated on by at least one software operating device provided within said at least one additional external software work tool.

2. The software work tool according to claim 1, wherein said work knowledge storer means stores one or more inference rules defining a logical executing condition and a processing method for operating on said program, and said controller means further includes an inference engine which executes said inference rules.

3. The software work tool according to claim 1, wherein said work knowledge storer means stores a plurality of frames as units of information, each of said plurality of frames corresponding to one concept of data and knowledge describing a relation between said plurality of frames, and said controller means further includes an inference engine which executes said programs on the basis of said knowledge describing said relation between said plurality of frames.

4. The software work tool according to claim 1, wherein said work knowledge storer means stores one or more objects provided as units of information, each said object corresponding to one concept of data, an order of said objects being based on a successive relation between each attribute included in each said concept, each said concept being able to communicate with each other and, said controller means includes a processing unit for executing said program on the basis of said objects.

5. A software work tool according to claim 1, wherein said work knowledge storer stores said work knowledge corresponding to a concept, each said concept being in an order based on a continuous relation between each attribute included in each said concept, and said work knowledge is provided with at least one object comprising a group of information which can mutually communicate with each other, and said controller is provided with a processing unit for executing said program based on the object.

6. A software work tool according to claim 1, wherein said work knowledge storer means stores one or more descriptions of a function, said controller means executes said programs on the basis of said function.

7. The software work tool according to claim 1, wherein said work knowledge storer means stores one or more fact clauses as descriptions indicating facts and one or more rule clauses as descriptions indicating rules, and said controller means further includes an inference engine for executing said program on the basis of said fact clauses and said rule clauses.

8. The software work tool according to claim 1, wherein said work knowledge storer means stores one or more rules of inference defining a logical execution condition and a processing method for operating on said program, and said controller means includes an inference engine which executes said program based on said rule of inference and a back track device which searches for a next inference rule when a failure takes place in the execution of said program based on said rule of inference.

9. The software work tool according to claim 1, wherein said work knowledge storer stores one or more metaknowledge as rule knowledge and one or more knowledge relating to an inference process and, said controller means includes an inference engine for executing said program based on said metaknowledge or based on said knowledge.

10. The software work tool according to claim 1, further comprising a blackboard memory which stores information produced in an inference process such that a plurality of said software work tools cooperate with each other through communication with said blackboard memory, and accessing means for enabling said plurality of said software work tool to access said blackboard memory in order to communicate with each other.

11. The software work tool according to claim 1, further comprising an agenda memory which stores information concerning an unsolved problem and a solved problem such that a plurality of software work tools cooperate with each other through communication with said agenda memory, and accessing means for enabling said plurality of said software work tools to access said agenda memory in order to communicate with each other.

12. The software work tool according to claim 1, further comprising a message switcher connected to said communicator means and to a communicator of another software work tool, to transmit and receive a communication message such that a plurality of said software work tools work in cooperation with each other through communication.

13. The software work tool according to claim 12, wherein said communicator means determines whether or not said communication message from said message switcher is an activation request, if said communication message is said activation request, then said communicator means receives a character string of a message, checks a format of said message, decodes said communication message, transmits said decoded message to said controller means and determines whether or not the said message is said activation request from said message switcher;

if said communications message is not said activation request from said message switcher, then the communicator means determines whether or not said message is an activation request from said controller means, if said message is the activation request from said controller means, said communicator means checks a format of said request message, prepares a transmission message format, activates said message switcher, supplies a character string of said message to said message switcher, informs said controller means that the message is normally transmitted and then determines whether or not said message is the activation request from said message switcher; and if said message is not said activation request from said controller means, then said communicator determines whether or not said message is the activation request from said message switcher.

14. The software work tool according to claim 1, further comprising a work tool activating device which receives a communication message from a software work tool, activates a software work tool designated by said communication message and transmits said communication message to said designated software work tool such that a plurality of said software work tools work in cooperation with each other through said work tool activating device.

15. The software work tool according to claim 1, wherein said work knowledge storer means further stores a data base.

16. The software work tool according to claim 1, wherein said work knowledge storer means further stores a procedure description indicating a work.

17. The software work tool according to claim 1, wherein said work knowledge storer means stores a logical chart diagram in which a flow of processing indicative of a work procedure is illustrated in a graphical fashion or stores information in a logical chart diagram.

18. The software work tool according to claim 1, wherein said work knowledge storer means stores a decision table of data, each said data indicating a plurality of conditions and commands relating to a work procedure, or stores data in a decision table.

19. The software work tool according to claim 1, wherein said work knowledge storer means stores a state transition diagram expressing a condition of a state transition relating to a work procedure or stores information in a state transition diagram.

20. The software work tool according to claim 1, wherein said work knowledge storer means stores information in a list structure, a tree structure or a graph structure relating to a work procedure or stores information in a list structure, a tree structure or a graph structure.

21. The software work tool according to claim 1, wherein said observation unit comprises an event observation unit for observing events occurring in said software work tool and designating whether said observed event is a timer activation event or a message activation event, and an internal memory unit for storing a timer element used for performing an event judgment process when said observed event is said timer activation event and for storing a message identifying information used for performing an event judgment process when said observed event is said message activation event.

22. The software work tool according to claim 1, wherein said work knowledge storer means stores a list of selector names acting as an identifying name of a message received from said communicator, an argument acting as a variable parameter, a plurality of rules formed as a set of conditions for inference, a command, a command group defined as a function accessed by said method and said rule, a tree structure knowledge in which data and fact are stored in a tree structure fashion and, an object control knowledge formed as tree structure data for controlling said method, said rule, said procedure and said tree structure knowledge.

23. The software work tool according to claim 1, wherein said software operating means determines whether or not a request is a software operation request from said controller means, if said request is said software operation request from said controller means, then said software operating means makes an input file addressed to software from a request information if necessary, makes a software executing command from said request information, transmits said executing command to an operating system to request an activation, determines whether or not said operating system normally receives said activation request, if said operating system receives said activation request, then said software operating means informs said controller means that said operating system is normally activated, requests said operating system to make a time-out notification after an elapse of a supervisory time, and repeats the processings following determining whether or not said request is said software operation request from said controller means;

if said operating system does not normally receive said activation request, then said software operating means transmits an error information indicative of activation failure to said controller means and repeats the processings following determining whether or not said request is said software operation request from said controller means;

if said request is not said software operation request from said controller means, then said software operating means determines whether or not said request is an ending information of the software activated by said operating system, if said request is said ending information, then said software operating means cancels the time-out notification request for said operating system, checks a software output file, an error message and a completion code and repeats the processings following determining whether or not said request is said software operation request from said controller means and repeats the processing following determining whether or not said request is said software operation request from said controller means after having transmitted a normal ending information to said controller means;

if the information is not the ending information of said software activated from said operating system, then said software operating means determines whether or not a request from said operating system is a time-out notification, if said request is the time-out notification, it is determined by said software operating means whether or not the software activated is ended, if the software activated is ended, then said software operating means repeats the processing following determining whether or not said request is said software operation request from said controller means after having transmitted an ending information and an error information indicative of an execution failure to said controller means;

if the activated software is not ended, then said software operating means requests said operating system to execute a forced ending of said software and repeats the processing following determining whether or not said request is said software operation request from said controller means after having transmitted an execution failure error information to said controller means; and if the request from said operating system is not a time-out notification request, then said software operating means repeats the processings following determining whether or not said request is said software operation request from said controller means.

24. The software work tool according to claim 1 for use in a computer system as an information processor, wherein said controller means includes:

a man-machine interface including a monitor and a keyboard;

message exchange mechanism means for exchanging communication messages with communicators of said software work tools external to said communicator means and for enabling a plurality of software tools to operate in a coordinated manner through mutual communications;

work tool booting-up mechanism means for receiving a communication message, for invoking a software tool designated by said communication message, and for passing a communication message to said software work took, such that a plurality of software work tools operate in a coordinated manner through mutual communication;

an editing program;

a screen/manipulation controller of an operating system; and a communication controller of an operating system for a network connecting said message exchange mechanism with said operating system, and said work knowledge storer means includes:
a work list file used by said editing program; and
a work knowledge base as an external memory for a work knowledge base in said software work tool.

25. The software work tool according to claim 24 for use in a computer system as an information processor, further comprising:

software operating means for converting data standardized within software work tools to a format conforming to a home system, thereby manipulating a program in said software work tool or information within a home system.

26. The software work tool according to claim 24 for use in a computer system as an information processor, wherein:

said message exchange mechanism means further performs a bi-directional conversion between a data format used by said home computer system and a data format standardized for exchanging a communication message with said network through said communication controller means of said operating system, for enabling a software work tool in said home system to operate in a manner coordinated with a software work tool in a foreign system.

27. The software work tool according to claim 1, wherein said controller means activates a predetermined constant operation as a demonstration based on said work knowledge stored in said work knowledge storer means when said observed operated on program satisfies predetermined conditions.

28. The software work tool according to claim 1, wherein said observation means includes an internal memory for storing a type of event indicating whether an observation event type is a timer activation event or a message activation event, a timer interval and an address of a function for executing an event determining processing if said type of event is said timer activation event and a message identifier information and an address of a function for executing an event determining processing if said type of event is said message activation event.

29. The software work tool according to claim 1, wherein said controller means determines whether or not said communication information is received from said communicator means, if said information is received from said communicator means, then said controller means searches messages having a coincident message selector from the content stored in said work knowledge storer means, compares arguments, decodes a procedure stored in said work knowledge storer means to execute an instruction, detects a rule having a condition established from rule groups stored in said work knowledge storer means and which are now effective after said instruction was executed, repeatedly executes an instruction on the rule having the established condition, if there is detected no rule whose condition is established, then said controller means repeats the processes following determining whether or not said information is received from said communicator means;

if said information is not received from said communicator means, then said controller means determines whether or not said information is received from said observation means, if said information is received from said observation means, then said controller means executes an instruction corresponding to an event on the basis of a received associated information, detects a rule having a condition established from rule groups stored in said work knowledge storer means and which are now effective and repeats the processes following executing said instruction corresponding to said condition; and if said information is not received from said observation means, then said controller means determines whether or not said information is said report from said software operating means, if said information is said report from said software operating means, then said controller means supplies a return information to a software operation instruction being executed so that said software operation instruction is continuously executed, detects a rule having a condition established from rule groups stored in said work knowledge storer means and which are now effective, repeats the functions following executing said instruction corresponding to said condition, if said information is not said report from said software operating means, then said controller means repeats the functions following determining whether said information is received from said communicator means.

30. The software work tool according to claim 1, wherein said observation means determines whether or not a request is said observation request from said controller means, if said request is said observation request from said controller means, then said observation means receives an event to be observed and information of an event decision from said work knowledge storer means, stores said event and said event information in an internal memory, determines whether said event is a timer activation event or a message activation event, if said event is said timer activation event, said observation means repeats the functions following determining whether or not said request is said observation request from said controller means after having requested the operating system to supply a timer activation information after a certain period of time, if said event is said message activation event, then said observation means immediately repeats the functions following determining whether or not said request is said observation request from said controller means;

if said request is not said observation request from said controller means, said observation means determines whether or not said request is said timer activation request from said operating system, if said request is said timer activation request, said observation means reads out a corresponding event decision processing from said internal memory, executes said event decision processing to determine whether or not said timer activation request is treated as an occurrence of an event, if said timer activation request is treated as said occurrence of said event, then said observation means deletes said event and said information of the event decision processing from said internal memory, transmits an associated information to said work knowledge storer means and repeats the functions following determining whether or not said request is said observation request from said controller means, if said timer activation request is not treated as said occurrence of said event, said observation means repeats the functions following determining whether or not said request is said observation request from said controller means after having requested said operating system to supply a timer activation request after a certain period of time; and if said request is not said timer activation request from said operating system, then said observation means determines whether or not said request is said message request from said operating system, if said request is said message request from said operating system, then said observation mean checks by the content of said internal memory whether said message request is a target message event, determines whether or not said event is a target event, if said event is said target event, then said observation means reads said event decision processing corresponding to said event and executes said event decision processing to thereby determine whether or not said event is treated as an occurrence of event, if said event is treated as said occurrence of event, then said observation means repeats the functions following deleting said event and said information of said event decision processing from said internal memory and then repeats the functions following determining whether or not said request is said observation request from said controller means when said event is not treated as said event decision, when it is determined by said checking within said internal memory that said event is not a target event and when it is determined that a message is not said request message in the decision processing for determining whether or not said message is said request message from said operating system.

* * * * *